United States Patent
Lee et al.

(10) Patent No.: US 12,518,844 B2
(45) Date of Patent: Jan. 6, 2026

(54) SEMICONDUCTOR DEVICE

(71) Applicant: Samsung Electronics Co., Ltd., Suwon-si (KR)

(72) Inventors: Jaewoo Lee, Suwon-si (KR); Yonghun Kim, Suwon-si (KR); Kihan Kim, Suwon-si (KR); ChangSik Yoo, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 319 days.

(21) Appl. No.: 18/319,584

(22) Filed: May 18, 2023

(65) Prior Publication Data

US 2023/0377667 A1 Nov. 23, 2023

(30) Foreign Application Priority Data

May 23, 2022 (KR) .................. 10-2022-0062921
Sep. 26, 2022 (KR) .................. 10-2022-0121609

(51) Int. Cl.
*G11C 29/12* (2006.01)
*G11C 29/36* (2006.01)

(52) U.S. Cl.
CPC .... *G11C 29/12015* (2013.01); *G11C 29/1201* (2013.01); *G11C 29/36* (2013.01)

(58) Field of Classification Search
CPC .......... G11C 29/12015; G11C 29/1201; G11C 29/36
USPC ...................................................... 365/201
See application file for complete search history.

(56) References Cited

U.S. PATENT DOCUMENTS

| | | | |
|---|---|---|---|
| 7,259,606 B2 | 8/2007 | Ku et al. | |
| 7,567,104 B2 | 7/2009 | Ku et al. | |
| 7,869,286 B2 | 1/2011 | Park et al. | |
| 8,024,599 B2 | 9/2011 | Liran | |
| 8,386,737 B2 | 2/2013 | Jeon et al. | |
| 9,229,470 B2 | 1/2016 | Ware | |
| 9,496,879 B1 | 11/2016 | Duan et al. | |
| 10,403,375 B2 | 9/2019 | Lee et al. | |
| 10,586,585 B2* | 3/2020 | Gopalan | G11C 29/028 |
| 2003/0031082 A1* | 2/2003 | Sawada | G11C 7/1066 365/233.1 |
| 2005/0265064 A1 | 12/2005 | Ku et al. | |

(Continued)

FOREIGN PATENT DOCUMENTS

KR 101050942 B1 7/2011
KR 102340446 B1 12/2021

*Primary Examiner* — Ly D Pham
(74) *Attorney, Agent, or Firm* — Myers Bigel, P.A.

(57) ABSTRACT

A semiconductor device includes: a data clock signal generator circuit configured to output a plurality of data clock signals that have different phases and that are used to generate a plurality of internal data clock signals of a memory device; a data transmitter configured to generate a data signal based on a test pattern transitioned once, delay the data signal once transitioned according to a delay value, and output the data signal to the memory device; a data receiver configured to receive an output signal from the memory device that includes first sampling data, the first sampling data being obtained by sampling the data signal based on a first internal data clock signal from the plurality of internal data clock signals; and a training circuit configured to change the delay value and determine a final value of the delay value based on the first sampling data.

20 Claims, 15 Drawing Sheets

(56) References Cited

U.S. PATENT DOCUMENTS

2008/0191771 A1   8/2008  Ku et al.
2019/0080774 A1   3/2019  Lee et al.

\* cited by examiner

FIG. 7

| DATA PATTERN | DELAY | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|---|
| 00001111 | SPD0 | 1 | 1 | 1 | 1 | 1 | 1 | 1 | 0 | 0 | 0 | 0 | 0 | 0 | 0 | 0 |
| 11110000 | | 0 | 0 | 0 | 0 | 0 | 0 | 0 | 1 | 1 | 1 | 1 | 1 | 1 | 1 | 1 |

FIG. 8

| DATA PATTERN | DELAY | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|---|
| 00001111 | SPD0 | 1 | 1 | 1 | 1 | 1 | 1 | 1 | 0 | 1 | 0 | 0 | 0 | 0 | 0 | 0 |

SEMICONDUCTOR DEVICE

CROSS-REFERENCE TO RELATED APPLICATIONS

This application is based on and claims priority to Korean Patent Application No. 10-2022-0062921 filed in the Korean Intellectual Property Office on May 23, 2022, and Korean Patent Application No. 10-2022-0121609 filed in the Korean Intellectual Property Office on Sep. 26, 2022, the entire contents of which are incorporated herein by reference.

BACKGROUND

1. Field

One or more embodiments of the present disclosure relates to a semiconductor device, and more particularly to a semiconductor device and a method of training a data clock signal to obtain an optimal duty cycle for data transmission.

2. Description of the Related Art

Component devices such as a memory device and computing systems including a system on chip (SoC) require high performance. The system on chip may provide clock signals and data clock signals to the component device for the purpose of high-rate data inputs and outputs for the component device. A duty cycle of the clock signal may fluctuate according to varying temperatures and/or voltages, and when the accurate duty cycle is not used, a margin for reading data signals becomes degraded. In addition, as the frequency of the data clock signal is higher than the frequency of the clock signal, it may be necessary to adjust the duty cycle of the data clock signal to obtain an accurate margin for data transmission.

SUMMARY

Aspects of the present disclosure provide a semiconductor device for training an optimal duty cycle of a data clock signal.

Aspects of the present disclosure provide a semiconductor device for training a data clock signal by using a write data pattern.

According to some example embodiments of the present disclosure, a semiconductor device may include: a data clock signal generator circuit configured to output a plurality of data clock signals that have different phases and that are used to generate a plurality of internal data clock signals of a memory device; a data transmitter configured to generate a data signal based on a test pattern transitioned once, delay the data signal once transitioned according to a delay value, and output the data signal to the memory device; a data receiver configured to receive an output signal from the memory device that includes first sampling data, the first sampling data being obtained by sampling the data signal based on a first internal data clock signal from the plurality of internal data clock signals; and a training circuit configured to change the delay value and determine a final value of the delay value based on the first sampling data.

The training circuit may be configured to determine the final value of the delay value based on a sampling delay value of the first sampling data, and the sampling delay value may correspond to when a bit value of the first sampling data is transitioned once.

The training circuit may be configured to determine the final value of the delay value based on an intermediate value of sampling delay values of the first sampling data, the intermediate value may be between a first sampling delay value and a second sampling delay value of the sampling delay values, the first sampling delay value may correspond to when a first bit value of the first sampling data is transitioned, and the second sampling delay value may correspond to when a second bit value of the first sampling data is transitioned, and the first and second bit values may both be transitioned from a same one of 1 to 0 or 0 to 1.

The training circuit may be configured to change a bit value of the test pattern, after determining the final value of the delay value, such that a timing when the data signal is transitioned is changed, the data receiver may be configured to receive an output signal from the memory device that includes second sampling data, the second sampling data being obtained by sampling the data signal that has the timing changed based on a second internal data clock signal from the plurality of internal data clock signals, and the training circuit may be configured to adjust a code that is used to generate the second internal data clock signal of the memory device, and may be configured to determine a final value of the code based on the second sampling data.

The training circuit may be configured to determine the final value of the code based on a sampling value of the code obtained from the second sampling data, and the sampling value of the code may correspond to when a bit value of the second sampling data is transitioned.

The training circuit may be configured to change the timing when the data signal is transitioned by one unit interval (UI) by changing one bit value of the test pattern.

The code may be used to adjust a delay of a data clock signal from the plurality of data clock signals and to generate the second internal data clock signal, and the second internal data clock signal may have a delay that is based on the code.

The first internal data clock signal and the second internal data clock signal may have a phase difference of 90 degrees.

According to some example embodiments of the present disclosure, a method for operating a semiconductor device may include: outputting a plurality of data clock signals having different phases and used in generating a plurality of internal data clock signals of a memory device; generating a data signal based on a test pattern transitioned once, delaying the data signal once transitioned according to a delay value, and outputting the data signal to the memory device; receiving an output signal from the memory device including first sampling data, the first sampling data being obtained by sampling the data signal based on a first internal data clock signal from the plurality of internal data clock signals; and determining a final value of the delay value based on the first sampling data.

The determining of the final value of the delay value may comprise determining a sampling delay value of the first sampling data, and the sampling delay value may correspond to when a bit value of the first sampling data is transitioned.

The determining of the final value of the delay value may comprise determining an intermediate value of sampling delay values of the first sampling data, the intermediate value may be between a first sampling delay value and a second sampling delay value of the sampling delay values, the first sampling delay value may correspond to when a first bit value of the first sampling data is transitioned, and the second sampling delay value may correspond to when a second bit value of the first sampling data is transitioned, and the first and second bit values may both be transitioned from a same one of 1 to 0 or 0 to 1.

The method may further include: changing a bit value of the test pattern, after determining the final value of the delay value, to change a timing when the data signal is transitioned; receiving an output signal including second sampling data from the memory device, the second sampling data being obtained by sampling the data signal that has the timing change based on a second internal data clock signal from the plurality of internal data clock signals; adjusting a code for generating the second internal data clock signal of the memory device; and determining a final value of the code based on the second sampling data.

The determining of the final value of the code may comprise determining a sampling value of the code obtained from the second sampling data, and the sampling value of the code may correspond to when a bit value of the second sampling data is transitioned.

The changing of the bit value of the test pattern may comprise changing the timing when the data signal is transitioned by one unit interval (UI).

The code may be used to adjust a delay of a data clock signal from the plurality of data clock signals and to generate the second internal data clock signal, and the second internal data clock signal may have a delay that is based on the code.

According to some example embodiments of the present disclosure, a computing system may include: a memory device comprising: a clock signal control circuit configured to receive and buffer a plurality of data clock signals with different phases and generate a plurality of internal data clock signals; and a plurality of sampler circuits configured to sample a data signal based on the plurality of internal data clock signals and output a plurality of sampling data; and a system on chip configured to serialize a test pattern to generate the data signal, delay the data signal according to a delay value, output the data signal to the memory device, determine a final value of the delay value based on a value of first sampling data from the plurality of sampling data, delay the data signal according to the final value of the delay value, and output the data signal that is delayed according to the final value of the delay value, the first sampling data may be obtained by sampling the data signal based on a first internal data clock signal from the plurality of internal data clock signals, and the first internal data clock signal may be synchronized with a timing when the data signal is transitioned.

The clock signal control circuit may be configured to generate a second internal data clock signal from the plurality of internal data clock signals by adjusting a phase of a data clock signal from the plurality of data clock signals according to a code, the system on chip may be configured to change one bit value of the test pattern to arrange a timing when the data signal is transitioned to correspond to an edge of the second internal data clock signal, adjust a value of the code, determine a final value of the code based on second sampling data, and store the final value of the code in the memory device, and the second sampling data may be obtained by sampling the data signal based on the second internal data clock signal.

The clock signal control circuit may comprise a buffer configured to generate the second internal data clock signal, and configured to adjust a delay of the data clock signal according to the code.

The first internal data clock signal and the second internal data clock signal may have a phase difference of 90 degrees.

The system on chip may be configured to determine the final value of the code based on a sampling value of the code obtained from the second sampling data, and the sampling value of the code may correspond to when a bit value of the second sampling data is transitioned.

BRIEF DESCRIPTION OF THE DRAWINGS

FIGS. 7 and 8 show tables of sampling data according to delay values of write DQ according to some example embodiments of the present disclosure.

DETAILED DESCRIPTION

Figure 1:
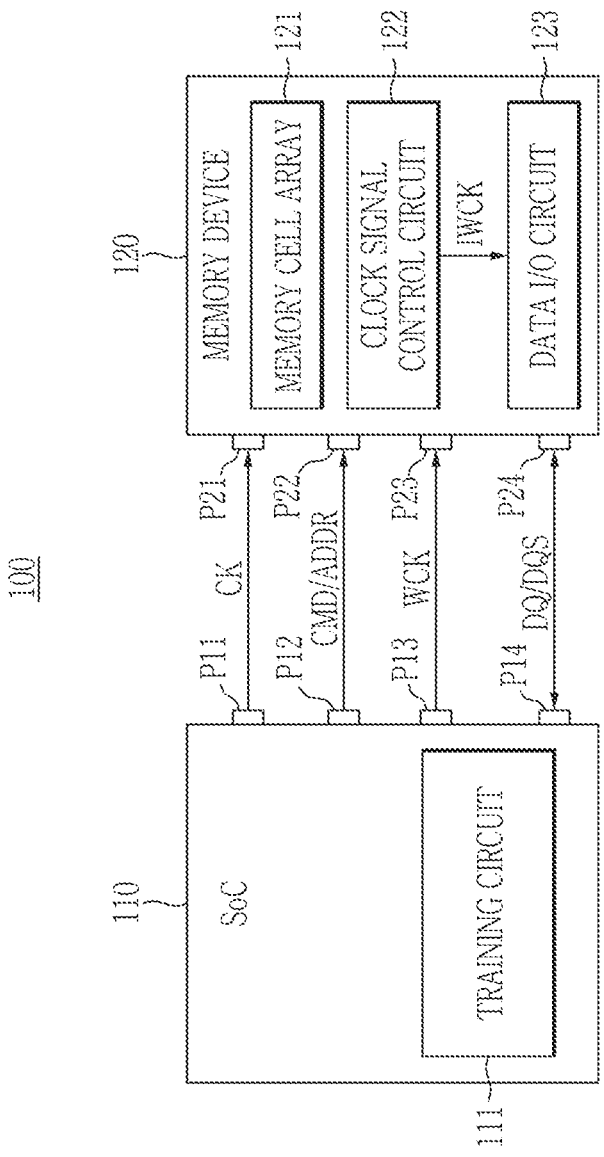
FIG. 1 shows a block diagram of a computing system according to some example embodiments of the present disclosure.

In the following detailed description, only certain embodiments have been shown and described, simply by way of illustration. As those skilled in the art would realize, the described embodiments may be modified in various different ways, all without departing from the scope of the present disclosure.

Accordingly, the drawings and description are to be regarded as illustrative in nature and not restrictive, and like reference numerals designate like elements throughout the specification. In the flowcharts described with reference to the drawings in this specification, the operation order may be changed, various operations may be merged, certain operations may be divided, and certain operations may not be performed.

An expression recited in the singular may be construed as singular or plural unless the expression "one", "single", etc., is used. Terms including ordinal numbers such as first, second, and the like, will be used only to describe various components, and are not to be interpreted as limiting these components. The terms may only be used to differentiate one component from others.

FIG. 1 shows a block diagram of a computing system according to some example embodiments.

Referring to FIG. 1, the computing system 100 may include a system on chip 110 and a memory device 120.

The system on chip 110 may be electrically connected to the memory device 120. In some embodiments, the system on chip 110 and the memory device 120 may be connected to each other through a memory interface and may transmit/receive signals to/from each other through the memory interface. In some embodiments, a clock signal pin P11, a command/address pin P12, a data clock signal pin P13, and a data pin P14 of the system on chip 110 may be connected to a clock signal pin P21, a command/address pin P22, a data clock signal pin P23, and a data pin P24 of the memory device 120.

The system on chip 110 may generate a command signal CMD, an address ADDR, a system clock signal CK, and a data clock signal WCK. The system on chip 110 may provide the system clock signal CK to the memory device 120 through the clock signal pins P11 and P21, may provide the command signal CMD/address ADDR to the memory device 120 through the command/address pins P12 and P22, and may provide the data clock signal WCK to the memory device 120 through the data clock signal pins P13 and P23.

The system on chip 110 may receive a data input and output signal DQ and a data strobe signal DQS from the memory device 120 through the data pins P14 and P24 or may transmit data processing results to the memory device 120. The DQS may be used to sample the DQ. The system on chip 110 provides a signal to the memory device 120 to control a memory operation of the memory device 120. The signal may include a command signal CMD and an address ADDR. In some embodiments, the system on chip 110 may provide the command signal CMD and the address ADDR to the memory device 120 to access the memory cell array 121 and may control the memory operation such as read or write. According to the read operation, the DQ and the DQS may be transmitted to the system on chip 110 from the memory cell array 121, and according to the write operation, the DQ and the DQS may be transmitted to the memory cell array 121 from the system on chip 110. The DQ and the DQS are respectively bidirectional signals so the DQ and the DQS output to the memory device 120 from the system on chip 110 may be respectively referred to as a write DQ and a write DQS, and the DQ and the DQS output to the system on chip 110 from the memory device 120 may be respectively referred to as a read DQ and a read DQS.

The command signal CMD may include an activate command, a read/write command, and a refresh command. In some embodiments, the command signal CMD may further include a precharge command. The activate command may be a command for switching a target row of the memory cell array 121 to an active state so as to write data on the memory cell array 121 or read data from the memory cell array 121. In response to the activate command, the memory cell of the target row may be activated (e.g., driving). The read/write command may be a command for performing a read or write operation at the target memory cell of the row switched to the active state. In some embodiments, the read command may be a command for activating an emphasis driving. The refresh command may be a command for performing a refresh operation at the memory cell array 121.

The system on chip 110 may apply the system clock signal CK and the data clock signal WCK to the memory device 120 so as to control the data input and output. The system clock signal CK may be provided in the form of differential signals having complementary phases. The data clock signal WCK may also be provided in the form of differential signals having complementary phases. The system clock signal CK may be a clock signal relating to a command signal CMD applied to perform a data input and output operation or a transmission rate of the address ADDR. The data clock signal WCK may be a clock signal relating to input and output rates of the DQ and the DQS. In some embodiments, the command CMD and the address signal ADDR may be transmitted based on the system clock signal CK. The DQ and the DQS may be transmitted based on the data clock signal WCK.

The system on chip 110 may include a training circuit 111. The training circuit 111 may perform memory core parameter training relating to memory cores including the memory cell array 121 of the memory device 120, a row decoder, and a column decoder, and/or may perform peripheral circuit parameter training on remaining peripheral circuits excluding the memory cores. The training circuit 111 may determine optimal parameters on the memory core parameters of the memory device 120 and/or the peripheral circuit parameters. The system on chip 110 including the training circuit 111 may perform the training of the memory device 120. In some embodiments, the training circuit 111 is included in the memory device 120, and the memory device 120 may perform the training.

In some embodiments, the training circuit 111 may provide a write DQ to the memory device 120, and may perform training on the data clock signal WCK based on the read DQ and the read DQS corresponding to the write DQ output from the memory device 120.

The training circuit 111 may serialize a test pattern and may output a result to the memory device 120 through the write DQ. For example, the training circuit 111 may serialize a test pattern and may output a result to the memory device 120 as a data signal.

In some embodiments, the write DQ having the serialized test pattern may be transitioned once. For example, when the test pattern has eight bits, the test pattern by which the write DQ is transitioned to the logic "0" from the logic "1" once or is transitioned to the logic "1" from the logic "0" once such as 11110000 or 00001111 may be output to the memory device 120. As used herein, the term "transitioned" (or similar language) may refer to a transition in a data pattern of bits from the logic "1" to the logic "0" or from the logic "0" to the logic "1". For example, the data pattern 00001111 may be transitioned once, and a fifth bit of the data pattern may be transitioned (e.g., to "1" from "0").

In some embodiments, the write DQ having the serialized test pattern may be transitioned at least once. For example, when the test pattern has eight bits, the test pattern by which the write DQ is transitioned to the logic "0" from the logic "1" at least once or is transitioned to the logic "1" from the logic "0" at least once such as 11110101, 11110011, 00001010, or 00001100 may be output to the memory device 120.

The training circuit 111 may delay the write DQ and output a result to the memory device 120. The training circuit 111 may adjust a delay value for delaying the write DQ. The memory device 120 may sample the write DQ according to an internal data clock signal IWCK. The memory device 120 may output write data obtained by sampling the write DQ as read data. For example, the memory device 120 may output the write data by using the read DQ and the read DQS. Hereinafter, read data output by the memory device 120, that is, write data generated when the memory device 120 samples the write DQ, will be referred to as "write data".

The training circuit 111 may determine a final value of the delay value based on a value of the write data. The value of the write data may be the logic "0" or the logic "1" according to a timing when the write DQ is transitioned and a sampling timing according to the internal data clock signal IWCK. For example, the value of the write data may be the logic "0" when the sampling timing according to the internal data clock signal IWCK is before the timing when the write DQ is transitioned to the logic "0" or the logic "1", and the value of the write data may be the logic "1" when the sampling timing according to the internal data clock signal IWCK is after the timing when the write DQ is transitioned to the logic "0" or the logic "1". The training circuit 111 may change the timing when the write DQ is transitioned to the logic "0" or the logic "1" by changing the delay value. That is, the training circuit 111 may delay the write DQ by changing the delay value, may receive the write data obtained by sampling the delayed write DQ, and may determine a final value of the delay value for transitioning the value of the write data. The training circuit 111 may fix the final value of the delay value for transitioning the value of the write data.

The training circuit 111 may change the test pattern so that the timing when the write DQ is transitioned may be changed per one unit interval (UI). In some embodiments, the training circuit 111 may perform the training of the internal data clock signal IWCK at the time of the write operation by changing the test pattern for each one bit. For example, when the training circuit 111 outputs the test pattern of 11110000 as the write DQ and fixes the delay value, the training circuit 111 may change the test pattern for each one bit as 11111000, 11111100, and 11111110.

The training circuit 111 may generate a code so that the memory device 120 may adjust a phase of the data clock signal WCK and may generate the internal data clock signal IWCK. The training circuit 111 may determine the final value of the code based on the value of the write data changeable according to the adjust value of the code. The training circuit 111 may program the final value of the code to the memory device 120.

In some embodiments, the training circuit 111 may serialize the write DQ obtained by changing the test pattern for each bit and may output the result to the memory device 120, and the memory device 120 may receive the write data obtained by sampling the write DQ. The training circuit 111 may provide a code to the memory device 120 so that the memory device 120 may shift the data clock signal WCK to generate the internal data clock signal IWCK. The training circuit 111 may adjust the value of the code. The clock signal control circuit 122 may adjust the delay of the data clock signal WCK according to the adjusted code. The clock signal control circuit 122 may buffer the delay-adjusted data clock signal WCK to generate the internal data clock signal IWCK. The data I/O circuit 123 may output the value-changed write data according to the delay of the internal data clock signal IWCK. For example, the value of the write data may be the logic "0" when the sampling timing according to the internal data clock signal IWCK is before the timing when the write DQ is transitioned to the logic "0" or the logic "1", and the value of the write data may be the logic "1" when the sampling timing according to the internal data clock signal IWCK is after the timing when the write DQ is transitioned to the logic "0" or the logic "1".

The training circuit 111 may change the sampling timing according to the internal data clock signal IWCK by adjusting the value of the code for adjusting the delay of the internal data clock signal IWCK. The training circuit 111 may adjust the value of the code for adjusting the delay of the internal data clock signal IWCK within the entire range, regarding the 1-bit changed test pattern. For example, when the code has four bits, and the training circuit 111 changes the test pattern by one bit and outputs a result, the value of the code for adjusting the delay of the internal data clock signal IWCK may be adjusted from 0000 to 1111.

In some embodiments, the training circuit 111 may adjust the value of the code to change the sampling timing according to the internal data clock signal IWCK, may receive the write data obtained by sampling the write DQ according to the changed sampling timing according to the internal data clock signal IWCK, and may determine the final value of the code for transitioning the value of the write data. In some embodiments, the training circuit 111 may determine the final values of a plurality of codes that correspond to test patterns changed for each bit. The system on chip 110 may store the final value of the code in mode registers of the memory device 120 according to a mode register write command.

In addition, the system on chip 110 may include various intellectual property (IP) circuits. The system on chip 110 may be referred to as an application processor (AP).

In some embodiments, the system on chip 110 may access the memory device 120 according to a request from a host that is outside the memory system 100. The system on chip 110 may communicate with the host by using various protocols.

The memory device 120 may be a storage device that is based on the semiconductor device. In some embodiments, the memory device 120 may include a dynamic random access memory (DRAM) device. In some embodiments, the memory device 120 may be a static random access memory (SRAM) device, a thyristor random access memory (TRAM) device, a NAND flash memory device, a NOR flash memory device, a resistive random access memory (RRAM) device, a ferroelectric random access memory (FRAM) device, a phase change random access memory (PRAM) device, a magnetic random access memory (MRAM) device, a solid state drive (SSD), a memory card, and a universal flash storage (UFS). Hereinafter, the memory device 120 will be referred to as a DRAM device (i.e., a synchronous dynamic random access memory (SDRAM) device) synchronized with the data clock signal WCK output by the system on chip 110. Particularly, the memory device 120 may be a low power double data rate 6 (LPDDR6) SDRAM. The memory device 120 may be a component device in addition to the storage device.

The memory device 120 may include a memory cell array 121, a clock signal control circuit 122, and a data input/output (I/O) circuit 123. The memory cell array 121 may include a plurality of memory cells connected to a plurality of rows and a plurality of columns. In some embodiments, the row is defined by a word line, and the column may be defined by a bit line. The data I/O circuit 123 may store the data transmitted to the memory cell array 121 from the outside (e.g., external to the memory device 120) or may output the data stored in the memory cell array 121 to the outside of the memory device 120 (i.e., the system on chip 110).

The clock signal control circuit 122 may output the internal data clock signal IWCK based on the data clock signal WCK. The clock signal control circuit 122 may adjust the delay of the data clock signal WCK to output the internal data clock signal IWCK. The clock signal control circuit 122 may adjust the delay of the data clock signal WCK based on the code received from the system on chip 110. The clock signal control circuit 122 may include a duty cycle adjusting circuit (e.g., a duty cycle adjuster (DCA) and a duty cycle corrector (DCC)). The clock signal control circuit 122 may include a slew rate adjust circuit. The slew rate adjust circuit may adjust a slew rate of the data clock signal WCK and may output a result as an internal data clock signal IWCK.

The data I/O circuit 123 may sample the write DQ based on the internal data clock signal IWCK. The data I/O circuit 123 may output the write data obtained by sampling the write DQ as the read DQ and/or the read DQS. In some embodiments, the data I/O circuit 123 may store the write data in the memory cell array 121, may read the write data from the memory cell array 121, and may output a result.

In some embodiments, the data I/O circuit 123 may sample the write DQ delayed by delay values according to the internal data clock signal IWCK. The data I/O circuit 123 may output a plurality of write data that correspond to the write DQ delayed by the delay values as the read DQ and/or the read DQS.

In some embodiments, the data I/O circuit 123 may sample the write DQ generated based on one test pattern according to the respective internal data clock signals IWCK of which the delay is adjusted according to a plurality of codes. The data I/O circuit 123 may output the write data that correspond to the respective internal data clock signals IWCK of which the delay is adjusted according to a plurality of codes as the read DQ and/or the read DQS.

Figure 2:
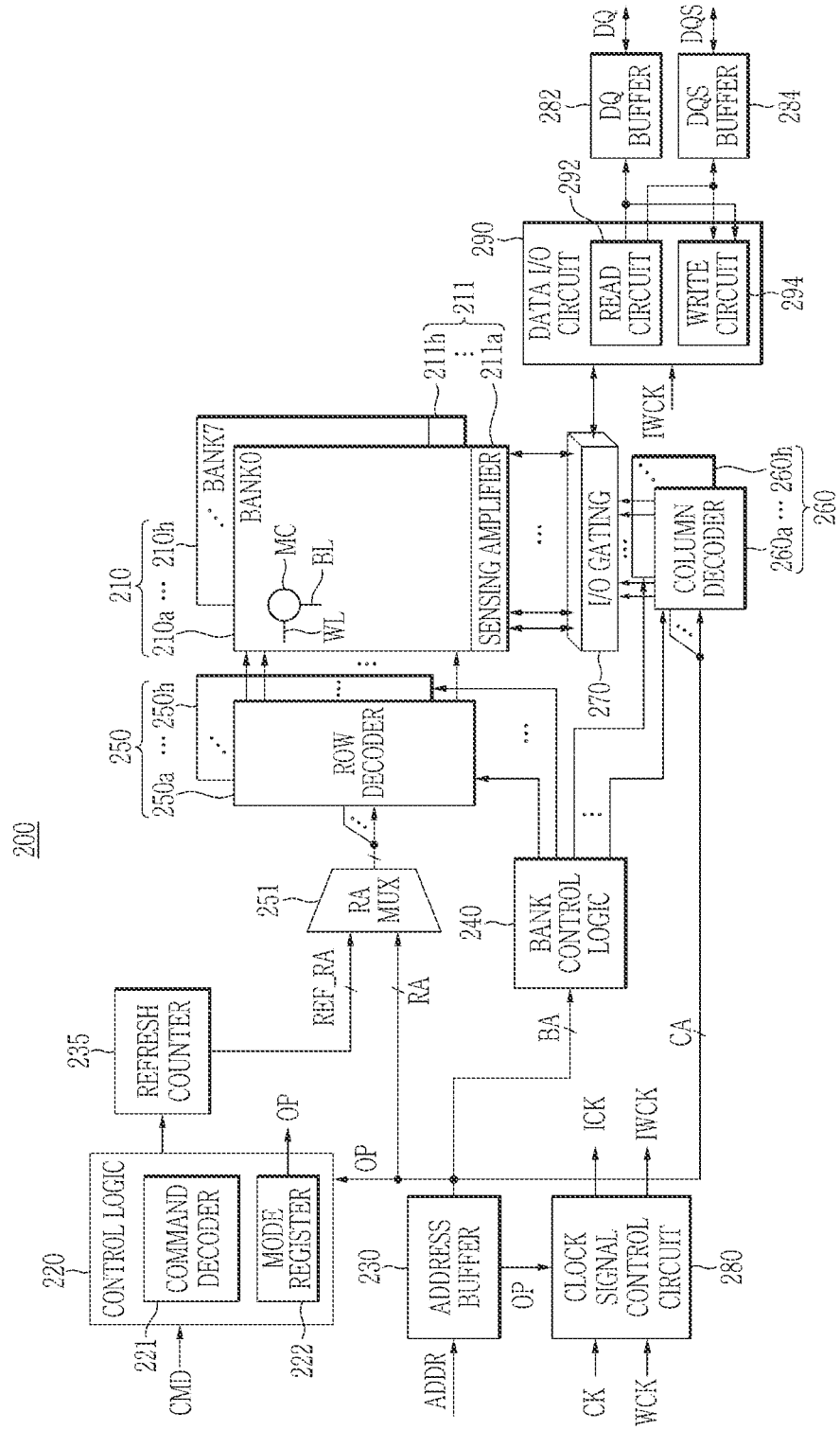
FIG. 2 shows a block diagram of a semiconductor memory device according to some example embodiments of the present disclosure.

FIG. 2 shows a block diagram of a semiconductor memory device according to some example embodiments.

Referring to FIG. 2, the memory device 200 may include a memory cell array 210, a sensing amplifier 211, a control logic circuit 220, an address buffer 230, a row decoder 250, a column decoder 260, an I/O gating circuit 270, a clock signal control circuit 280, and a data I/O circuit 290.

The memory cell array 210 may include a plurality of memory cells MC. In some embodiments, the memory cell array 210 may include a plurality of memory banks 210a to 210h. FIG. 2 shows eight memory banks BANK0 to BANK7 or 210a to 210h, but the number of the memory banks is not limited thereto. The respective memory banks 210a to 210h may include a plurality of rows, a plurality of columns, and a plurality of memory cells MC arranged on crossing points of the rows and the columns. In some embodiments, the rows may be defined by a plurality of word lines WL, and the columns may be defined by a plurality of bit lines BL.

The control logic circuit 220 may control an operation of the memory device 200. For example, the control logic circuit 220 may generate control signals so that the memory device 200 may perform a read operation, a write operation, and an offset calibration operation. In some embodiments, the control logic circuit 220 may include a command decoder 221. The command decoder 221 may decode a command signal CMD received from the system on chip (e.g., 110 of FIG. 1) to generate the control signals. The command decoder 221 may decode the command output by the system on chip 110 and may control internal constituent elements of the memory device 200. For example, the command decoder 221 may decode an activate command, a read command, a write command, a precharge command, a mode register write command, and a multi-purpose command (MPC). The above-described commands may be predetermined in the Joint Electron Devices Engineering Council (JEDEC) standard.

In some embodiments, the control logic circuit 220 may further include a mode register 222 for setting an operation mode of the memory device 200. The mode register 222 may store the code provided by the address buffer 230. The number of the mode registers 222, the address, and the code size may be defined in the JEDEC standard. As issuing the mode register write command and the code, the system on chip 110 may change values stored in the mode register 222 and may set an operating condition and an operation mode of the memory device 200.

The address buffer 230 may receive the address ADDR provided by the system on chip 110. The address ADDR may include a row address RA for indicating a row of the memory cell array 210 and a column address CA for indicating a column thereof. The row address RA may be provided to the row decoder 250, and the column address CA may be provided to the column decoder 260. In some embodiments, the row address RA may be provided to the row decoder 250 through a row address multiplexer (RA MUX) 251. In some embodiments, the address ADDR may further include a bank address BA for indicating the memory bank. The bank address BA may be provided to the bank control logic 240.

The address buffer 230 may provide the address received from the system on chip 110 together with the mode register write command to the mode register 222 and/or the clock signal control circuit 280 as a code OP. Here, the code OP may be transmitted through command and address transmitting paths between the system on chip 110 and the memory device 200. The code OP may be stored in the mode register 222 so it may be referred to as an operation code (OPCODE) or an operand.

In some embodiments, the memory device 200 may further include a bank control logic 240 for generating a bank control signal in response to the bank address BA. The bank control logic 240 may activate the row decoder 250 corresponding to the bank address BA from among a plurality of row decoders 250 and may activate the column decoder 260 corresponding to the bank address BA from among a plurality of column decoders 260 in response to the bank control signal.

In some embodiments, the memory device 200 may further include a row address multiplexer 251. The row address multiplexer 251 may receive the row address RA from the address buffer 230, and may receive a row address REF_RA to be refreshed from the refresh counter 235. The row address multiplexer 251 may selectively output the row address RA received from the address buffer 230 and the row address REF_RA received from the refresh counter 235 to the row decoder 250.

The row decoder 250 may select the row to be activated from among a plurality of rows of the memory cell array 210 based on the row address. To achieve this, the row decoder 250 may apply a driving voltage to the word line that corresponds to the row to be activated. In some embodiments, a plurality of row decoders 250a to 250h that correspond to a plurality of memory banks 210a to 210h may be provided.

The column decoder 260 may select the column to be activated from among a plurality of columns of the memory cell array 210 based on the column address. To achieve this, the column decoder 260 may activate the sensing amplifier 211 that corresponds to the column address CA through the I/O gating circuit 270. In some embodiments, a plurality of column decoders 260a to 260h that respectively correspond to a plurality of memory banks 210a to 210h may be provided. In some embodiments, the I/O gating circuit 270 gates the input/output data, and may include a data latch for storing data read from the memory cell array 210 and a write driver for writing data to the memory cell array 210. The data read from the memory cell array 210 are sensed by the sensing amplifier 211, and may be stored in the I/O gating circuit 270 (e.g., the data latch). In some embodiments, a plurality of sensing amplifiers 211a to 211h that respectively correspond to a plurality of memory banks 210a to 210h may be provided.

In some embodiments, the data (e.g., the data stored in the data latch) read from the memory cell array 210 may be provided to the system on chip 110 through the data I/O circuit 290. The data to be programmed to the memory cell array 210 may be provided to the data I/O circuit 290 from the system on chip 110, and the data provided to the data I/O circuit 290 may be provided to the I/O gating circuit 270.

The clock signal control circuit 280 may receive the system clock signal CK and the data clock signal WCK. The clock signal control circuit 280 may buffer the system clock signal CK to generate the internal clock signal ICK. The phase of the buffered internal clock signal ICK may be almost identical with the phase of the system clock signal CK. In some embodiments, the clock signal control circuit 280 may generate the internal clock signal ICK by dividing the system clock signal CK. In some embodiments, the clock signal control circuit 280 may generate the internal data clock signal IWCK by using the data clock signal WCK. The clock signal control circuit 280 may adjust the delay of the data clock signal WCK by using the code OP. The clock signal control circuit 280 may include a slew rate adjust circuit. The slew rate adjust circuit may adjust the delay of the data clock signal WCK based on the code OP. The clock signal control circuit 280 may output the internal clock signal ICK and the internal data clock signal IWCK.

The DQ buffer 282 may receive a write DQ from the system on chip 110 or may output a read DQ to the system on chip 110. As the DQ is a bidirectional signal, the DQ buffer 282 may include a receiver (not shown) for receiving the write DQ and a transmitter (not shown) for outputting the read DQ. The DQS buffer 284 may receive the write DQS and/or a write DQSB from the system on chip 110 or may output the read DQS and/or a read DQSB to the system on chip 110. As the DQS is a bidirectional signal, the DQS buffer 284 may include a receiver (not shown) for receiving the write DQS and a transmitter (not shown) for outputting the read DQS.

The data I/O circuit 290 may include a read circuit 292 and a write circuit 294. The read circuit 292 may receive read data from the sensing amplifier 211. The read circuit 292 may serialize the read data, and may transmit the read DQS and the read DQ to the system on chip 110 through the DQ buffer 282 and the DQS buffer 284. The read circuit 292 may be operable based on the internal data clock signal IWCK. The write circuit 294 may receive the write DQ and write DQS from the system on chip 110 through the DQ buffer 282 and the DQS buffer 284. The write circuit 294 may sample or parallelize the write DQ by using the write DQS and may provide a sampling result to the write driver as write data. The write circuit 294 may be operable based on the internal data clock signal IWCK.

Figure 3:
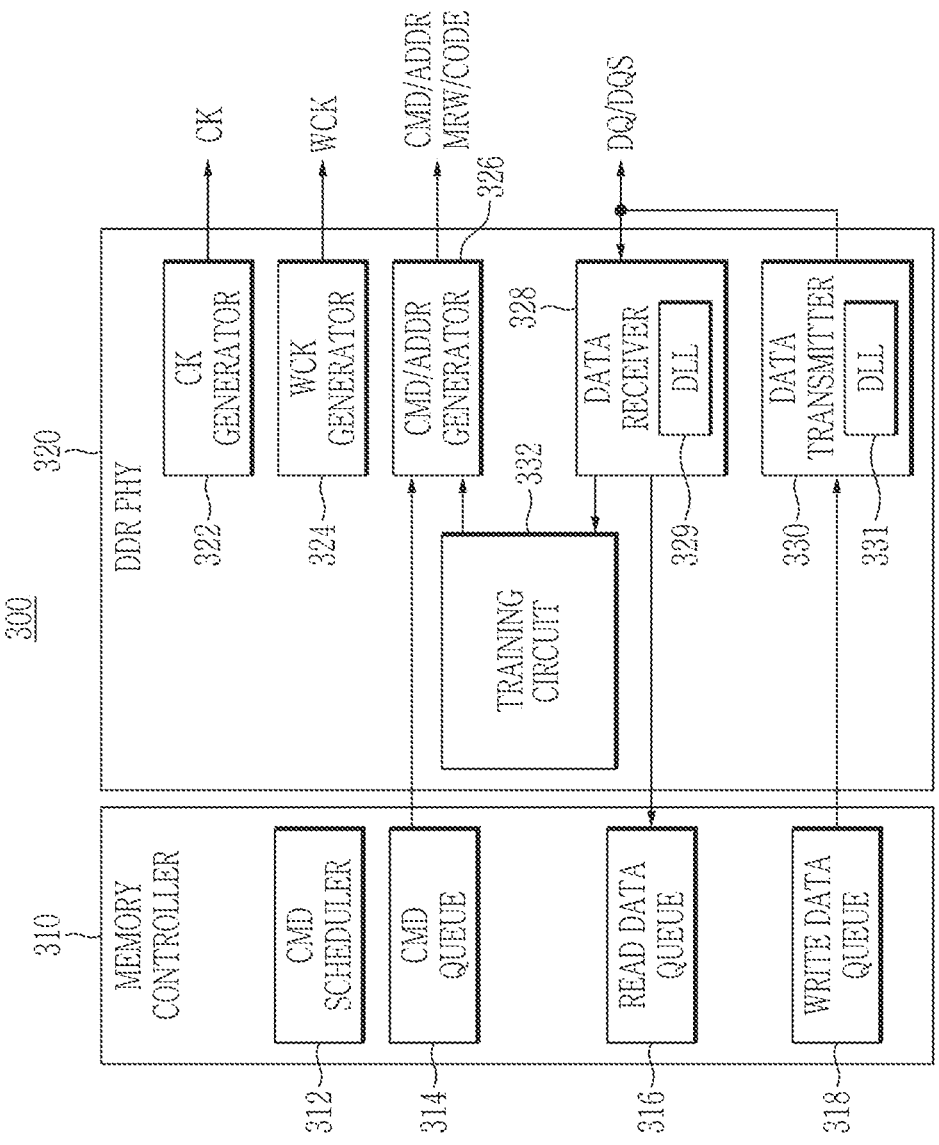
FIG. 3 shows a block diagram of a system on chip according to some example embodiments of the present disclosure.

FIG. 3 shows a block diagram of a system on chip according to some example embodiments.

Referring to FIG. 3, the system on chip 300 may include a memory controller 310 and a double data rate physical layer (DDR PHY) 320. As used herein, the system on chip 300 may also be referred to as a semiconductor device. The memory controller 310 may control the memory device 200 of FIG. 2 through the DDR PHY 320. The memory controller 310 may generate commands and addresses for accessing the memory device 200. The memory controller 310 may generate data to be stored in the memory device 200. The memory controller 310 may receive the data stored in the memory device 200.

The DDR PHY 320 may also be referred to as a DDR PHY interface. The DDR PHY 320 may transmit the system clock signal CK, the data clock signal WCK, and the commands and the addresses CMD/ADDR to the memory device 200 based on communications from the memory controller 310. The DDR PHY 320 may transmit the DQ and the DQS to the memory device 200 based on the communications by the memory controller 310. The DDR PHY 320 may receive the DQ and the DQS from the memory device 200. The paths for the DDR PHY 320 to transmit the DQ and the DQS to the memory device 200 and the paths for the memory device 200 to transmit the DQ and the DQS to the DDR PHY 320 may be identical to each other and may be shared.

The memory controller 310 may include a command scheduler 312, a command queue 314, a read data queue 316, and a write data queue 318. The command queue 314 may store the commands and the addresses issued by an external processor. The command and the address stored in the command queue 314 may be provided to the DDR PHY 320 based on communications from the command scheduler 312. In this instance, the at least one command and the at least one address stored in the command queue 314 may be provided to the DDR PHY 320 in parallel. The command scheduler 312 may adjust an order of the command(s) and the address(es) stored in the command queue 314, a time when the command(s) and the address(es) are input to the command queue 314, and a time when the command(s) and the address(es) are output from the command queue 314.

The read data queue 316 may store the read data transmitted from the memory device 200 through the DDR PHY 320 by a read request on the memory device 200 of the system on chip 300. The read data stored in the read data queue 316 may be processed by an external processor. The write data queue 318 may store the write data to be stored in the memory device 200. The write data stored in the write data queue 318 may be transmitted to the memory device 200 through the DDR PHY 320 according to the write request on the memory device 200 of the system on chip 300. For example, the command queue 314, the command scheduler 312, the read data queue 316, and the write data queue 318 of the memory controller 310 may be realized by using a hardware method, a software method, or a combination thereof in the system on chip 300.

The DDR PHY 320 may include a clock signal generator 322, a data clock signal generator 324, a command and address generator 326, a data receiver 328, a data transmitter 330, and a training circuit 332. The clock signal generator 322, the data clock signal generator 324, the command and address generator 326, the data receiver 328, the data transmitter 330, and the training circuit 332 of the DDR PHY 320 may be realized by using a hardware method, a software method, or a combination thereof in the system on chip 300.

The clock signal generator 322 may generate the system clock signal CK output to the memory device 200. The data clock signal generator 324 may generate the data clock signal WCK output to the memory device 200. Although not shown in FIG. 3, the clock signal generator 322 may include a DCC or a DCA for adjusting the duty cycle of the system clock signal CK. The data clock signal generator 324 may include a DCC or a DCA for adjusting the duty cycle of the data clock signal WCK.

The command and address generator 326 may receive the command or the address from the command queue 314 and may transmit the command or the address to the memory device 200. For example, the number of the command and address transmitting paths between the command and address generator 326 and the memory device 200, logic states of the signals transmitted through the above-noted transmitting paths, and transmission methods may be defined in the JEDEC standard of the memory device 200.

The data receiver 328 may receive the read data (or the write data of FIG. 1) from the memory device 200. The read data (or the write data of FIG. 1) received by the data receiver 328 from the memory device 200 may also be referred to as an output signal. The data receiver 328 may provide the received read data (e.g., an output signal) to the read data queue 316. The data receiver 328 may arrange the read DQS and the read DQ or may adjust the skew between the read DQS and the read DQ. The data receiver 328 may include a delay locked loop (DLL) 329 including a plurality of delay cells. For example, the data receiver 328 may delay the read DQS or the read DQ based on a time unit delayed by one delay cell of the DLL 329, and may find an optimal sampling point for the system on chip 300 to distinguish the read DQ.

The data transmitter 330 may receive the write data from the write data queue 318. The data transmitter 330 may transmit or output the received write data to the memory device 200. The write data (e.g., the write DQ) output by the data transmitter 330 may also be referred to as a data signal. The data transmitter 330 may arrange the write DQS and the write DQ or may adjust the skew between the write DQS and the write DQ. The data transmitter 330 may include a DLL 331 including a plurality of delay cells. The data transmitter 330 may delay the write DQS or the write DQ (e.g., a data signal) based on the time unit delayed by one delay cell of the DLL 331, and may find the optimal sampling point for the memory device 200 to distinguish the write DQ.

The training circuit 332 may control the data transmitter 330 based on control of a training program. The training circuit 332 may output the test pattern as the write DQ. The data transmitter 330 may serialize the test pattern to output the write DQ.

The training circuit 332 may delay the write DQ by using the DLL 331 of the data transmitter 330 and may output a result. The training circuit 332 may change the delay value for delaying the write DQ and may output the write DQ. For example, the training circuit 332 may change the delay value for delaying the write DQ based on the time unit (hereinafter, a delay step) delayed by one delay cell of the DLL 331. The training circuit 332 may output the write DQ according to the changed delay value.

The data transmitter 330 may delay the write DQ for respective delay steps and may output results, and the data receiver 328 may receive the write data generated by sampling the write DQ delayed for the respective delay steps and output by the memory device 200 of FIG. 2, as read data (e.g., an output signal).

In some embodiments, the training circuit 332 may determine the final value of the delay value of the write DQ based on the value of the write data. For example, the training circuit 332 may fix the delay value of the write DQ by using the delay value when the value of the write data is transitioned to the logic "1" from the logic "0" or is transitioned to the logic "0" from the logic "1".

After the delay value of the write DQ is fixed, the training circuit 332 may change the test pattern so that the timing when the write DQ is transitioned may be changed by 1 UI. That is, the training circuit 332 may change the timing when the write DQ is transitioned by 1 UI by changing one bit value of the test pattern. For example, when the test pattern is 8-bit data, the data transmitter 330 may output the write DQ obtained by serializing the test pattern for eight UIs. When first to fourth bit values of the test pattern are "0" and fifth to eighth bit values are "1", the write DQ may have a voltage of the logic "0" for a period that corresponds to the first to fourth bit values (period of four UIs), and it may have a voltage of the logic "1" for a period that corresponds to the fifth to eighth bit values (period of four UIs). That is, the timing when the write DQ is transitioned to the voltage of the logic "1" from the voltage of the logic "0" may correspond to the fifth bit value of the test pattern. The training circuit 332 may change the fourth bit value of the test pattern to "1" so that the write DQ may have the voltage of the logic "0" for the period that corresponds to the first through third bit values (period of three UIs), or it may change the fifth bit value of the test pattern to "0" so that the write DQ may have the voltage of the logic "0" for the period that corresponds to the first through fifth bit values (period of five UIs). In some embodiments, the training circuit 332 may change the test pattern by one bit, and the data transmitter 330 may output the 1-bit changed test pattern.

The training circuit 332 may control the command and address generator 326 based on communications from the training program. For example, the command and address generator 326 may generate a read command and a write command for training by the training program and may transmit the same to the memory device 200.

In further detail, the training circuit 332 may control the command and address generator 326 so that the command and address generator 326 may output a mode register write command MRW and a code CODE to the memory device 200. The training circuit 332 may provide the value of the code CODE to the command and address generator 326. The mode register write command MRW may be a command for writing the code CODE to the mode register 222 of the memory device 200 of FIG. 2. The training circuit 332 may set the delay of the internal data clock signal IWCK output by the clock signal control circuit 280 by changing the value of the code CODE stored in the mode register 222 of the memory device 200 through the mode register write command MRW.

In some embodiments, the training circuit 332 may change the value of the code CODE based on the value of the write data obtained by sampling the write DQ based on the 1-bit changed test pattern. The training circuit 332 may change the value of the code CODE and may output the same when outputting the write DQ. In some embodiments, the data transmitter 330 may output the write DQ (e.g., a data signal) based on the 1-bit changed test pattern, and the data receiver 328 may receive the write data generated by sampling the write DQ with the internal data clock signal IWCK of which the delay is adjusted according to the value of the code CODE by the memory device 200, as read data (e.g., an output signal). The training circuit 332 may determine the final value of the code CODE by using the value of the code CODE when the value of the write data is transitioned to the logic "1" from the logic "0" or is transitioned to the logic "0" from the logic "1".

According to some embodiments, the training circuit 332 may perform clock signal training of the memory device 200 based on the read DQ of the data receiver 328. As the training circuit 332 is positioned not in the memory device 200 but in the system on chip 300, the training circuit 332 may determine the optimal duty cycle to which the signal delay and the slew rate according to a physical interface between the memory device 200 and the system on chip 300 is reflected.

Figure 4:
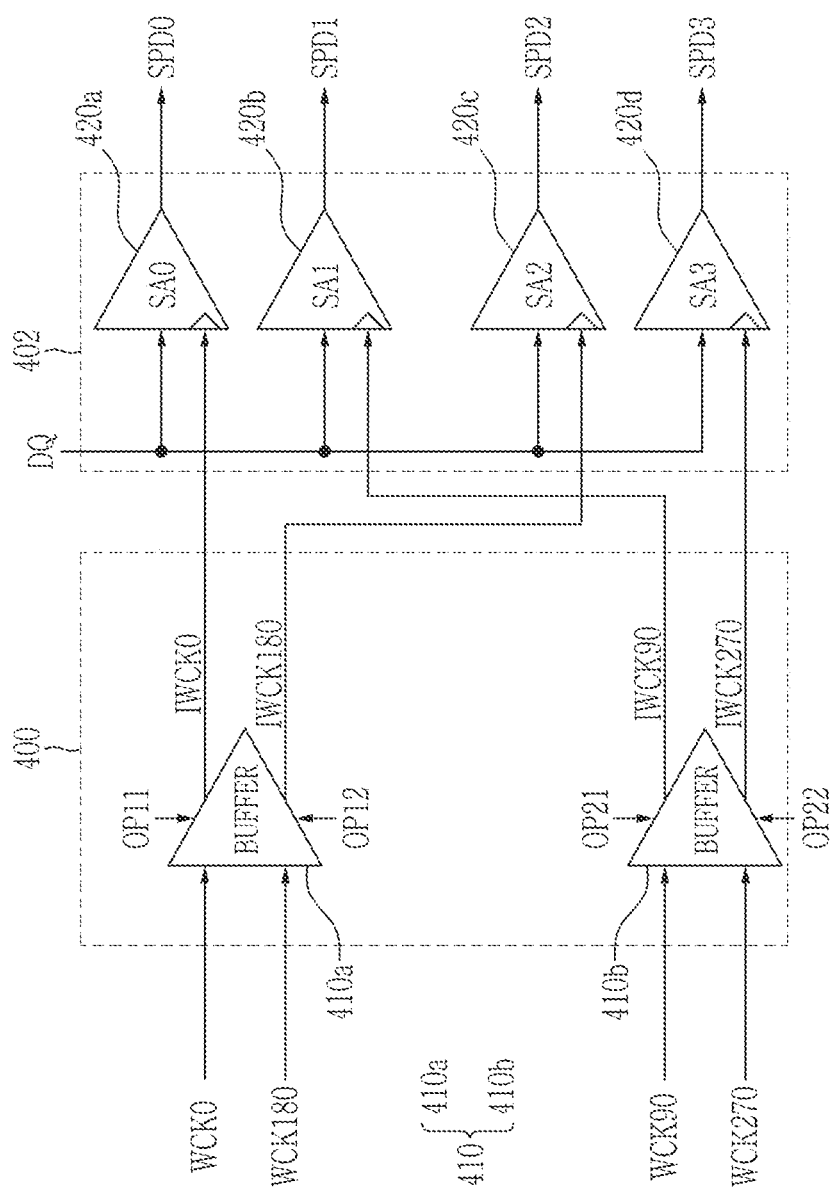
FIG. 4 shows a block diagram of a clock signal control circuit and a write circuit according to some example embodiments of the present disclosure.

FIG. 4 shows a block diagram of a clock signal control circuit and a write circuit according to some example embodiments.

Referring to FIG. 4, the clock signal control circuit 400 may include a buffer 410 (for example, including buffers 410a and 410b). The clock signal control circuit 400 may output a plurality of data clock signals WCK0, WCK180, WCK90, and WCK270 as a plurality of internal data clock signals IWCK0, IWCK180, IWCK90, and IWCK270. The data clock signals WCK0, WCK180, WCK90, and WCK270 may have phase differences of 90 degrees with each other.

The buffer 410 may receive the complementary data clock signals WCK0 and WCK180 or WCK90 and WCK270, may adjust delays of the data clock signals WCK0 and WCK180 or WCK90 and WCK270, and may output the same as the internal data clock signals IWCK0 and IWCK180 or IWCK90 and IWCK270. The buffer 410 may adjust the delays of the data clock signals WCK0 and WCK180 or WCK90 and WCK270 according to the codes OP11, OP12, OP21, and OP22. In some embodiments, the buffer 410 may include a current mode logic (CML) to complementary metal-oxide semiconductor (CMOS) amplifier. In some embodiments, the buffer 410 may adjust the delays of the data clock signals WCK0, WCK90, WCK180, and WCK270 by controlling the slew rates of the input data clock signals WCK0, WCK90, WCK180, and WCK270.

Table 1 exemplarily expresses steps for the buffer 410b to adjust the delay of the data clock signal WCK90 according to the value of the second code OP21[n:0] (n is a positive integer). A type of DELAY is "W" in Table 1. Regarding Table 1, the second code OP21[n:0] may be configured to be four bits, but the present disclosure is not limited thereto.

TABLE 1

| Function | Type | OP21 | Data |
|---|---|---|---|
| DELAY | W | OP21[3:0] | 0000b: 0 Step (Default) |
| | | | 0001b: −1 Step |
| | | | 0010b: −2 Step |
| | | | 0011b: −3 Step |
| | | | 0100b: −4 Step |
| | | | 0101b: −5 Step |
| | | | 0110b: −6 Step |
| | | | 0111b: −7 Step |
| | | | 1000b: RFU |
| | | | 1001b: +1 Step |
| | | | 1010b: +2 Step |
| | | | 1011b: +3 Step |
| | | | 1100b: +4 Step |
| | | | 1101b: +5 Step |
| | | | 1110b: +6 Step |
| | | | 1111b: +7 Step |

When the value of the code OP21[3:0] is '0000b', the buffer 410b may not adjust the delay of the data clock signal WCK90. When the value of the code OP21[3:0] is changed to one of the values of '0001b' through '0111b', the buffer 410b may reduce the delay of the data clock signal WCK90 by the step that corresponds to the value of the code OP21[3:0]. The buffer 410b may adjust the delay of the data clock signal WCK90 from step −1 to step −7. Similarly, when the value of the code OP21[3:0] changes to one of the values of '1001b' through '1111b', the buffer 410b may increase the delay of the data clock signal WCK90 by the step that corresponds to the value of the code OP21[3:0]. The buffer 410b may adjust the delay of the data clock signal WCK90 from step +1 to step +7. Sizes of the unit step in Table 1 may be predetermined. In an embodiment, the "1000b" reserved for future use (RFU) may be a reserved bit for expansion.

The read circuit 402 samples the write DQ in synchronization with the internal data clock signals IWCK0, IWCK90, IWCK180, and IWCK270 transmitted from the clock signal control circuit 400, and may output sampling data SPD0, SPD1, SPD2, and SPD3 obtained by sampling the write DQ. The read circuit 402 may include a plurality of sampler circuits 420a, 420b, 420c, and 420d (i.e., SA0, SA1, SA2 and SA3).

The internal data clock signals IWCK0, IWCK90, IWCK180, and IWCK270 may be respectively applied to the sampler circuits 420a, 420b, 420c, and 420d. For example, the internal data clock signals IWCK0, IWCK90, IWCK180, and IWCK270 may be applied to clock signal input terminals of the sampler circuits 420a, 420b, 420c, and 420d, respectively.

The sampler circuits 420a, 420b, 420c, and 420d may sample the write DQ in synchronization with the applied internal data clock signals IWCK0, IWCK90, IWCK180, and IWCK270. For example, the sampler circuit 420a may sample the first bit and fifth bit values of the write DQ at a rising edge of the internal data clock signal IWCK0. The sampler circuit 420b may sample the second bit and sixth bit values of the write DQ at the rising edge of the internal data clock signal IWCK90. The sampler circuit 420c may sample the third bit and seventh bit values of the write DQ at the rising edge of the internal data clock signal IWCK180. The sampler circuit 420d may sample the fourth bit and eighth bit values of the write DQ at the rising edge of the internal data clock signal IWCK270. The sampling data SPD0, SPD1, SPD2, and SPD3 obtained by sampling the write DQ are write data and may be stored in the memory cell array 210 of FIG. 2.

The write DQ, the internal data clock signals IWCK0, IWCK90, IWCK180, and IWCK270, and the sampling data SPD0, SPD1, SPD2, and SPD3 will now be described with reference to FIGS. 5 to 11.

Figure 5:
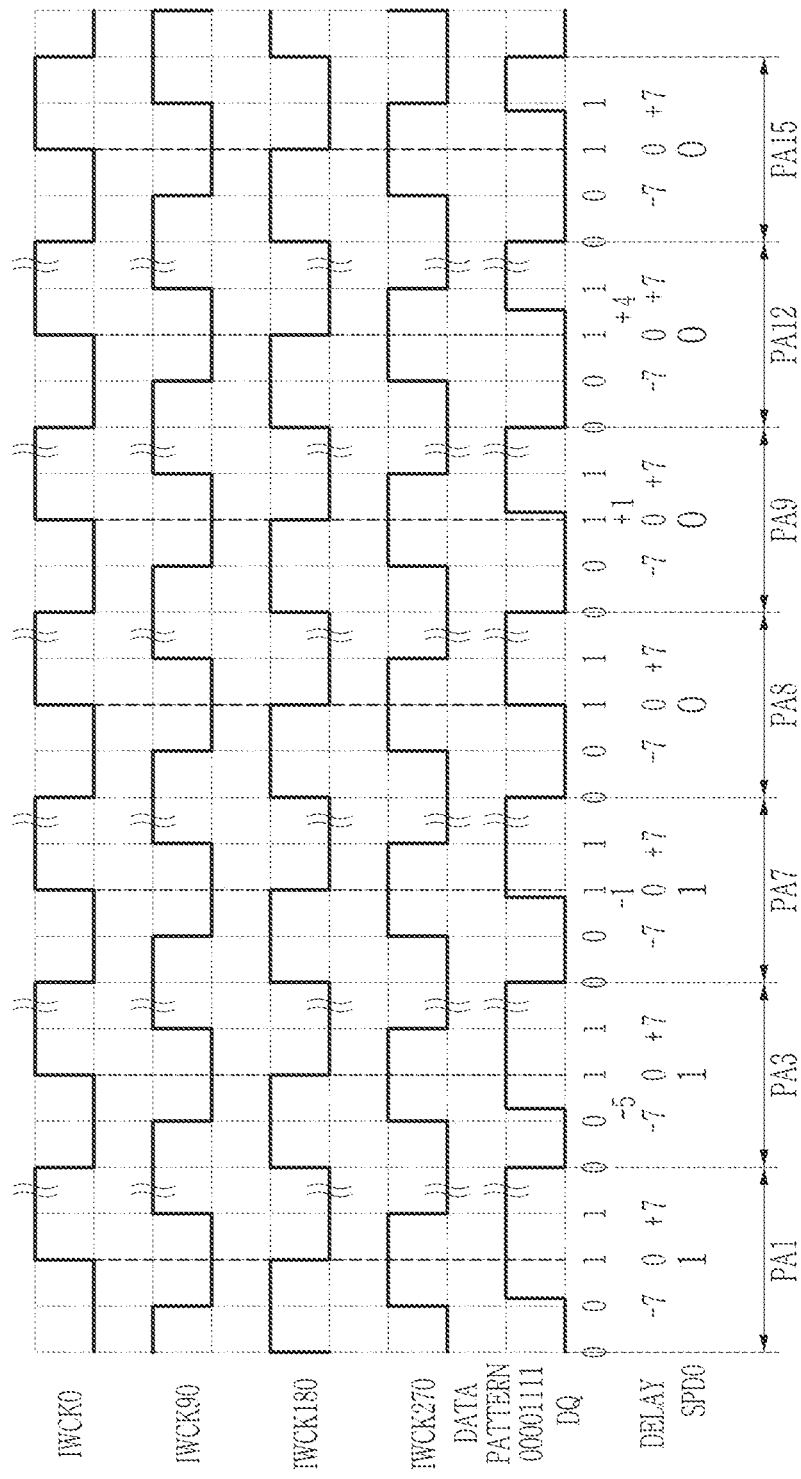
FIGS. 5 and 6 show graphs of waveforms of input and output signals of a clock signal control circuit and a write circuit according to some example embodiments of the present disclosure.
Figure 6:
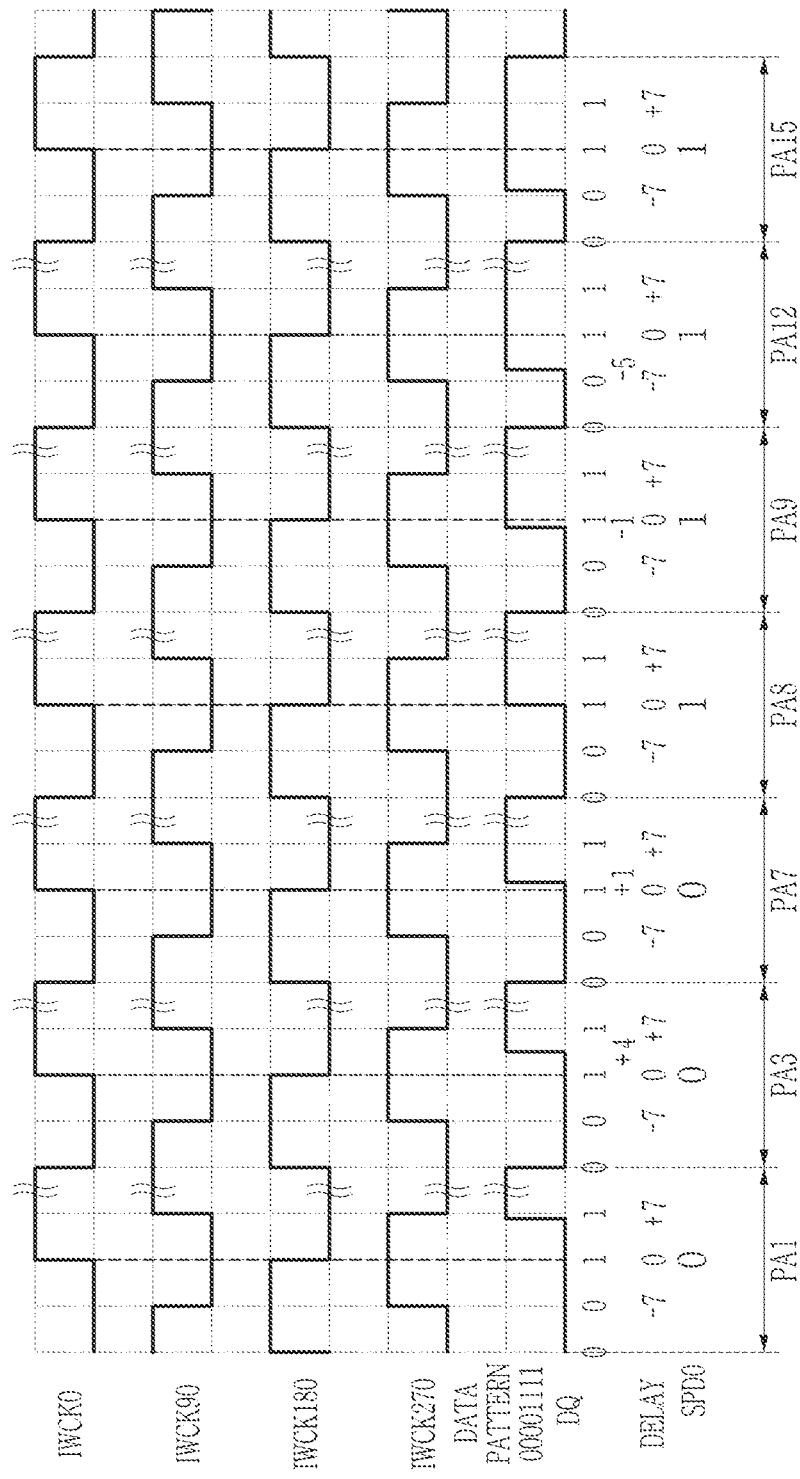

FIGS. 5 and 6 show graphs of waveforms of input and output signals of a clock signal control circuit and a write circuit.

Referring to FIG. 5, when the test pattern is "00001111", the write DQ marked as DQ may be transitioned to the logic "1" from the logic "0". For the respective periods PA1, . . . , PA3, . . . , PA7, PA8, PA9, . . . , PA12, . . . , PA15, a waveform of the write DQ marked as DQ may be the third bit to sixth bit values of the test pattern.

For the respective periods PA1, . . . , PA3, . . . , PA7, PA8, PA9, . . . , PA12, . . . , PA15, the system on chip 300 may delay the write DQ marked as DQ. The system on chip 300 may delay the write DQ marked as DQ by one delay step. The system on chip 300 may delay the write DQ so that the timing when the write DQ marked as DQ is transitioned to the logic "1" from the logic "0" may be synchronized with the rising edge of the internal data clock signal IWCK0. It will be described hereafter that the timing when the write DQ marked as DQ is transitioned to the logic "1" from the logic "0" is synchronized with the rising edge of the internal data clock signal IWCK0, and the system on chip 300 may synchronize the timing when the write DQ marked as DQ is transitioned to the logic "1" from the logic "0" with the rising edges of the other internal data clock signals IWCK90, IWCK180, and IWCK270. Here, the test pattern may have data that are changed to have the timing when the write DQ marked as DQ sampled by the sampler circuits 420b, 420c, and 420d receiving the respective internal data clock signals IWCK90, IWCK180, and IWCK270 is transitioned to the logic "1" from the logic "0" in synchronization with the respective internal data clock signals IWCK90, IWCK180, and IWCK270. For example, the test pattern may be "10000111", "11000011", or "11100001".

In some embodiments, the sampler circuit 420a may output the sampling data SPD0 by sampling the write DQ marked as DQ of which the delay value DELAY is adjusted. For the respective periods PA1, . . . , PA3, . . . , PA7, PA8, PA9, . . . , PA12, . . . , PA15, the sampler circuit 420a may sample the write DQ marked as DQ that corresponds to the fifth bit value of the test pattern at the rising edge of the internal data clock signal IWCK0. When the write DQ marked as DQ is advanced to the step −7 for the period of PA1, the write DQ marked as DQ at the rising edge of the internal data clock signal IWCK0 has the logic "1" so the value of the sampling data SPD0 sampled by the sampler circuit 420a may be "1". In a like way, the value of the sampling data SPD0 for the respective periods PA3, . . . , PA7, PA8, PA9, . . . , PA12, . . . , PA15 may be "1", . . . , "1", "0", "0", . . . , "0", . . . , "0". For the period of PA8, the value of the sampling data SPD0 may be transitioned to "0" from "1". The system on chip 300 may fix the delay value of the write DQ marked as DQ to the delay value DELAY for the period of PA8 when the value of the sampling data SPD0 is transitioned to "0" from "1".

Referring to FIG. 6, when the test pattern is "00001111", the write DQ marked as DQ may be transitioned to the logic "1" from the logic "0". For the respective periods PA1, . . . , PA3, . . . , PA7, PA8, PA9, . . . , PA12, . . . , PA15, the waveform of the write DQ marked as DQ may have the third bit to sixth bit values of the test pattern.

For the respective periods PA1, . . . , PA3, . . . , PA7, PA8, PA9, . . . , PA12, . . . , PA15, the system on chip 300 may delay the write DQ marked as DQ. The system on chip 300 may delay the write DQ marked as DQ by one delay step. The system on chip 300 may delay the write DQ to synchronize the timing when the write DQ marked as DQ is transitioned to the logic "1" from the logic "0" with the rising edge of the internal data clock signal IWCK0.

In some embodiments, the sampler circuit 420a may output the sampling data SPD0 by sampling the write DQ marked as DQ of which the delay value DELAY is adjusted. For the respective periods PA1, . . . , PA3, . . . , PA7, PA8, PA9, . . . , PA12, . . . , PA15, the sampler circuit 420a may sample the write DQ marked as DQ that corresponds to the fifth bit value of the test pattern at the rising edge of the internal data clock signal IWCK0. When the write DQ marked as DQ is delayed to the step +7 for the period of PA1, the write DQ marked as DQ at the rising edge of the internal data clock signal IWCK0 has the logic "0" so the value of the sampling data SPD0 sampled by the sampler circuit 420a may be "0". In a like way, the value of the sampling data SPD0 for the respective periods PA3, . . . , PA7, PA8, PA9, . . . , PA12, . . . , PA15 may be "0", . . . , "0", "1", "1", . . . , "1", . . . , "1". For the period of PA8, the value of the sampling data SPD0 may be transitioned to "1" from "0". The system on chip 300 may fix the delay value of the write DQ marked as DQ to the delay value DELAY for the period of PA8 when the value of the sampling data SPD0 is transitioned to "1" from "0".

The delay value DELAY has been described to sequentially increase to the step −7 from the step +7 or decrease to the step +7 from the step −7, but the method for the system on chip 300 to adjust the delay value DELAY is not limited thereto.

A method for the system on chip 300 to determine the final value OP21 of the first code will now be described with reference to FIGS. 7 and 8.

FIGS. 7 and 8 show tables of sampling data according to delay values of write DQ according to some example embodiments.

The system on chip 300 may determine the final value of the delay value of the write DQ based on the value of the sampling data SPD0 that corresponds to the delay value of the write DQ. When the test pattern is "00001111", the system on chip 300 may determine the final value of the delay value of the write DQ based on the delay value DELAY by which the value of the sampling data SPD0 is transitioned to "1" from "0". In some embodiments, when the value of the sampling data SPD0 is transitioned twice to "1" from "0" according to noise, the system on chip 300 may determine the final value of the delay value of the write DQ with an intermediate value of the delay values DELAY that are transitioned twice to "1" from "0". When the test pattern is "11110000", the system on chip 300 may determine the final value of the delay value of the write DQ based on the delay value DELAY by which the value of the sampling data SPD0 is transitioned to "0" from "1". In some embodiments, when the value of the sampling data SPD0 is transitioned twice to "0" from "1" by noise, the system on chip 300 may determine the final value of the delay value of the write DQ with the intermediate value of the delay values DELAY that are transitioned twice to "0" from "1".

Referring to FIG. 7, when the test pattern is "00001111", the value of the sampling data SPD0 according to the delay value DELAY of the changed write DQ is changed to "0" from "1" at the step 0 so the system on chip 300 may determine the final value of the delay value of the write DQ to be a value for indicating the step 0.

When the test pattern is "11110000", the value of the sampling data SPD0 according to the delay value DELAY of the changed write DQ is changed to "1" from "0" at the step 0 so the system on chip 300 may determine the final value of the delay value of the write DQ to be a value indicating the step 0.

Referring to FIG. 8, when the test pattern is "00001111", the value of the sampling data SPD0 according to the delay value DELAY of the changed write DQ may be transitioned twice to "0" from "1" by noise. Hence, the value of the sampling data SPD0 is changed to "0" from "1" at the step 0, and is changed to "0" from "1" at the step +2 so the system on chip 300 may determine the final value of the delay value of the write DQ to be the value indicating the step +1 that is the intermediate value of the step 0 and the step +2. For example, the step 0 may be a first sampling delay value that corresponds to the value of the sampling data SPD0 being transitioned a first time (e.g., a bit value transitioned to "0" from "1"), the step +2 may be a second sampling delay value that corresponds to the value of the sampling data SPD0 being transitioned a second time (e.g., a bit value transitioned to "0" from "1"), and the intermediate value may be a delay value between the first sampling delay value and the second sampling delay value (e.g., the value indicating the step +1). For example, the value of the sampling data SPD0 being transitioned the first time and the value of the sampling data SPD0 being transitioned the second time may both comprise a bit value being transitioned from 1 to 0. However, the present disclosure is not limited thereto and in other embodiments the value of the sampling data SPD0 being transitioned the first time and the value of the sampling data SPD0 being transitioned the second time may both comprise a bit value being transitioned from 0 to 1. In other words, the value of the sampling data SPD0 being transitioned the first time and the value of the sampling data SPD0 being transitioned the second time may both comprise a bit value being transitioned from a same one of 1 to 0 or 0 to 1.

The system on chip 300 may determine the final value of the delay value of the write DQ, fix the write DQ with the final value of the determined delay value, and may output the same. By this, the write DQ and the internal data clock signal IWCK0 may be arranged. When the write DQ and the internal data clock signal IWCK0 are arranged, the system on chip 300 may train the internal data clock signals IWCK90, IWCK180, and IWCK270.

In some embodiments, the system on chip 300 may change the test pattern for each one bit, may serialize the changed test pattern, and may output the write DQ (e.g., may output a data signal). The system on chip 300 may provide the codes OP21, OP12, and OP22 for controlling the buffer 410 corresponding to the write DQ based on the changed test pattern. The system on chip 300 may determine the final value of the codes OP21, OP12, and OP22 based on the values of the sampling data SPD1, SPD2, and SPD3 confirmed with the read DQ output from the memory device 200. Hence, the system on chip 300 may train the internal data clock signals IWCK0, IWCK90, IWCK180, and IWCK270 so that the internal data clock signals IWCK0, IWCK90, IWCK180, and IWCK270 may have a constant phase difference.

Figure 9:
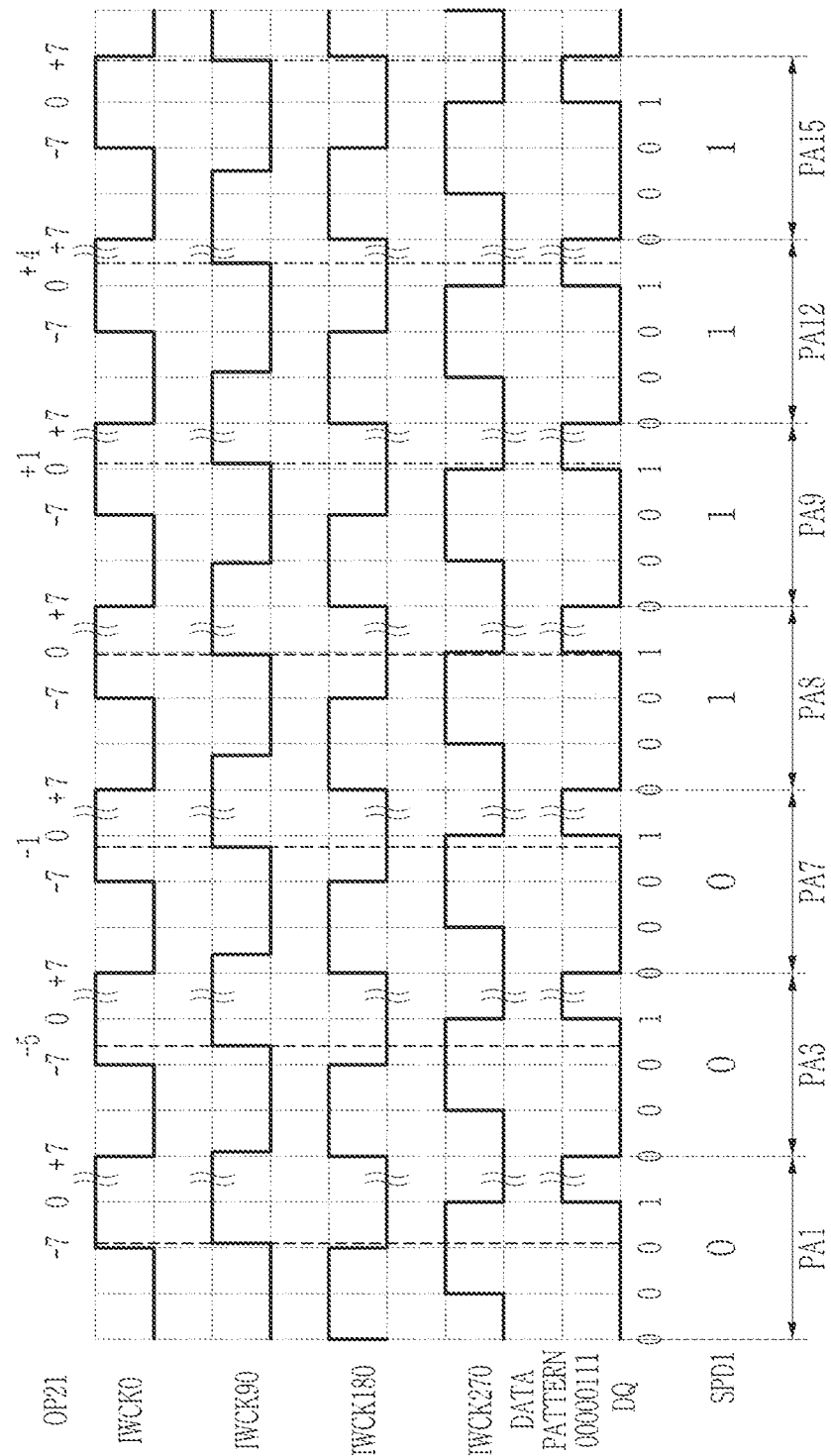
FIGS. 9 to 11 show graphs of waveforms of input and output signals of a clock signal control circuit and a data I/O circuit according to some example embodiments of the present disclosure.
Figure 10:
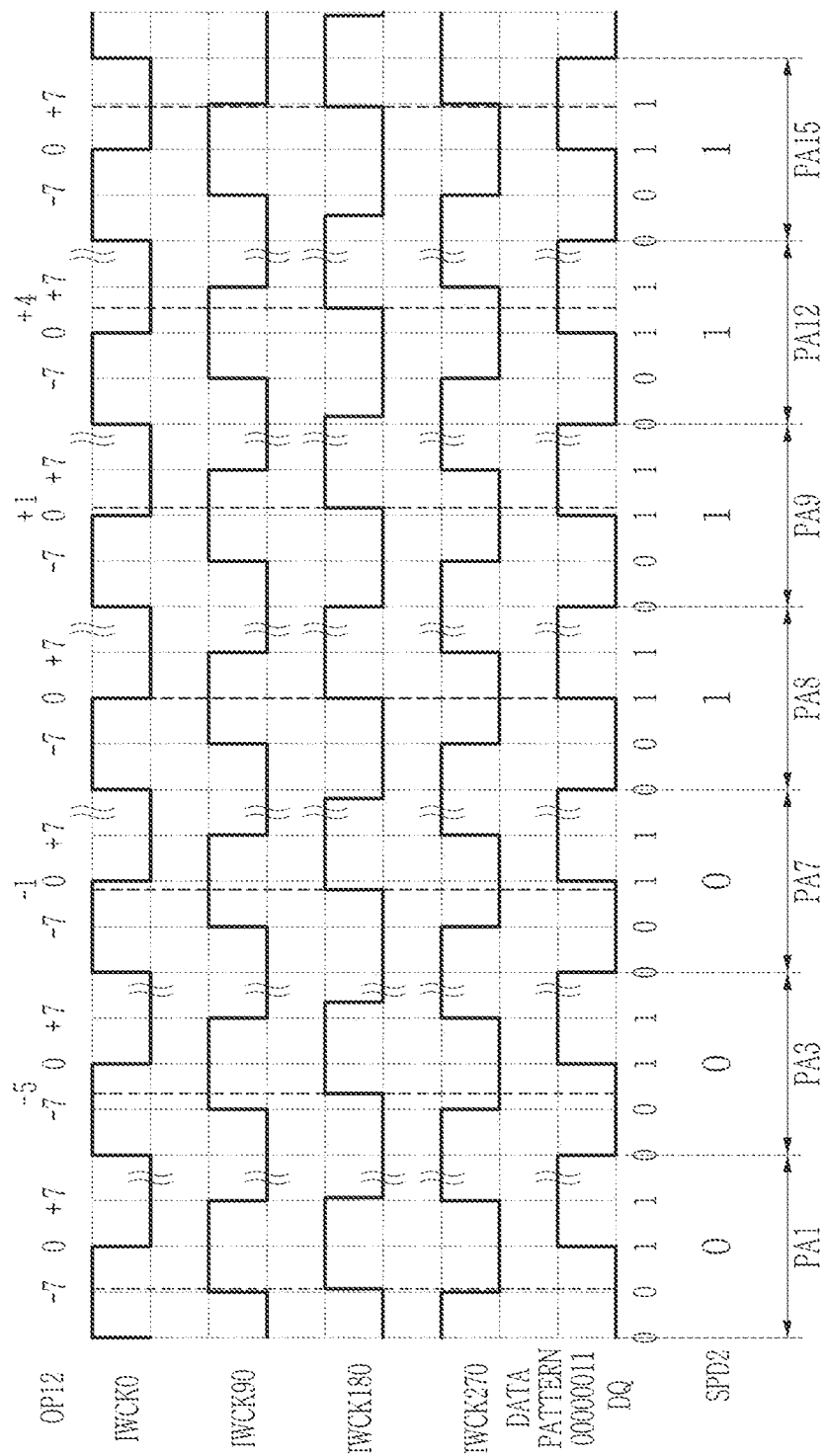
Figure 11:
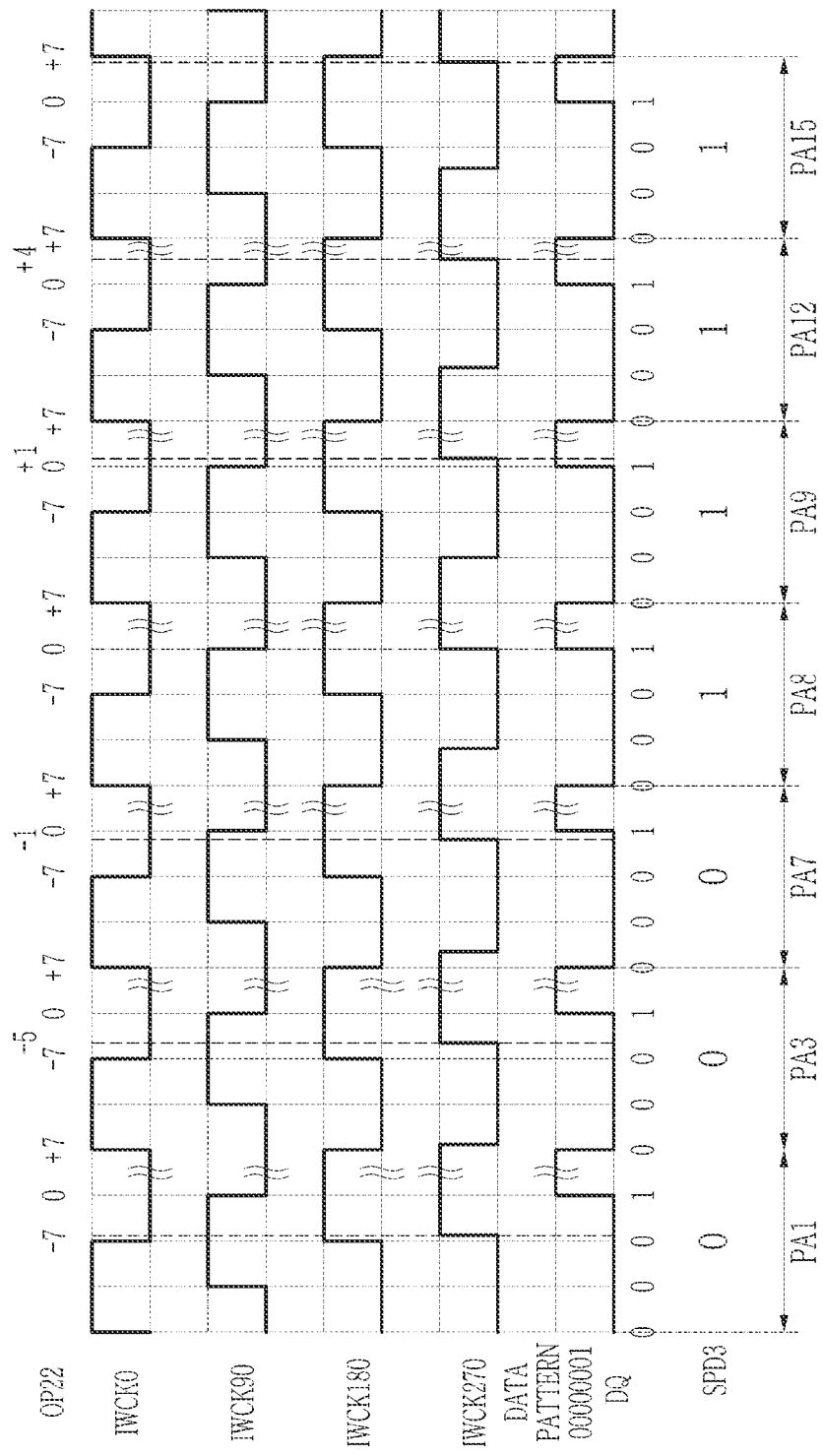

FIGS. 9 to 11 show graphs of waveforms of input and output signals of a clock signal control circuit and a read circuit.

Referring to FIG. 9, the system on chip 300 may provide the write DQ marked as DQ based on the test pattern of "00000111" generated by changing the fifth bit of the test pattern of "00001111" to "0" from "1". The write DQ marked as DQ may be transitioned to the logic "1" from the logic "0" at the time that corresponds to the sixth bit of the test pattern of "00000111". The system on chip 300 may adjust the code OP21 for adjusting the delay of the internal data clock signal IWCK90 provided to the sampler circuit 420b for sampling the sixth bit. For the respective periods PA1, . . . , PA3, . . . , PA7, PA8, PA9, . . . , PA12, . . . , PA15, the waveform of the write DQ marked as DQ may be the third bit to sixth bit values of the test pattern.

The code OP21 may be provided to the buffer 410b of the clock signal control circuit 400. For the respective periods PA1, . . . , PA3, . . . , PA7, PA8, PA9, . . . , PA12, . . . , PA15, the system on chip 300 may adjust the code OP21. For the respective periods PA1, . . . , PA3, . . . , PA7, PA8, PA9, . . . , PA12, . . . , PA15, the clock signal control circuit 400 may adjust the delay of the data clock signal WCK90 with the steps of −7, . . . , −5, . . . , −1, 0, +1, . . . , +4, . . . , +7 according to the code OP21, and may output a result as the internal data clock signal IWCK90. The sampler circuit 420b may output the sampling data SPD1 according to the delay-adjusted internal data clock signal IWCK90. For the respective periods PA1, . . . , PA3, . . . , PA7, PA8, PA9, . . . , PA12, . . . , PA15, the sampler circuit 420b may sample the write DQ marked as DQ that corresponds to the sixth bit value of the test pattern at the rising edge of the internal data clock signal IWCK90.

When the code OP21 is provided to have the value of the step −7 for the period PA1, the write DQ marked as DQ at the rising edge of the internal data clock signal IWCK90 is the logic "0" so the value of the sampling data SPD1 sampled by the sampler circuit 420b may be "0". In a like way, for the respective periods PA3, . . . , PA7, PA8, PA9, . . . , PA12, . . . , PA15, the value of the sampling data SPD1 may be "0", . . . , "0", "1", "1", . . . , "1", . . . , "1".

For the period PA8, the value of the sampling data SPD1 may be transitioned to "1" from "0". The system on chip 300 may determine the final value of the code OP21 to be the value ("0") of the code OP21 for the period PA8 during which the value of the sampling data SPD1 is transitioned to "1" from "0".

The system on chip 300 may provide the code OP21 for controlling the buffer 410b to the memory device 200, and may determine the final value of the code OP21 based on the sampling data SPD1 confirmed with the read DQ output from the memory device 200. Hence, the system on chip 300 may train the internal data clock signals IWCK0 and IWCK90 so that a phase difference between the internal data clock signal IWCK0 and the internal data clock signal IWCK90 may be accurately 90 degrees.

Referring to FIG. 10, the system on chip 300 may provide the write DQ marked as DQ based on the test pattern of "00000011" obtained by changing the sixth bit of the test pattern of "00000111" to "0" from "1". The write DQ marked as DQ may be transitioned to the logic "1" from the logic "0" at the time that corresponds to the seventh bit of the test pattern of "00000011". The system on chip 300 may adjust the code OP12 for adjusting the delay of the internal data clock signal IWCK180 provided to the sampler circuit 420c for sampling the seventh bit. For the respective periods PA1, . . . , PA3, . . . , PA7, PA8, PA9, . . . , PA12, . . . , PA15, the waveform of the write DQ marked as DQ may be the fifth bit to eighth bit values of the test pattern.

The code OP12 may be provided to the buffer 410a of the clock signal control circuit 400. For the respective periods PA1, . . . , PA3, . . . , PA7, PA8, PA9, . . . , PA12, . . . , PA15, the system on chip 300 may adjust the code OP12. For the respective periods PA1, . . . , PA3, . . . , PA7, PA8, PA9, . . . , PA12, . . . , PA15, the clock signal control circuit 400 may adjust the delay of the data clock signal WCK180 with the steps −7, . . . , −5, . . . , −1, 0, +1, . . . , +4, . . . , +7 according to the code OP12, and may output a result as the internal data clock signal IWCK180. The sampler circuit 420c may output the sampling data SPD2 according to the delay-adjusted internal data clock signal IWCK180. For the respective periods PA1, . . . , PA3, . . . , PA7, PA8, PA9, . . . , PA12, . . . , PA15, the sampler circuit 420c may sample the write DQ marked as DQ that corresponds to the seventh bit value of the test pattern at the rising edge of the internal data clock signal IWCK180.

When the code OP12 is provided to have the value of the step −7 for the period PA1, the write DQ marked as DQ at the rising edge of the internal data clock signal IWCK180 is the logic "0" so the value of the sampling data SPD2 sampled by the sampler circuit 420c may be "0". In a like way, for the respective periods PA3, . . . , PA7, PA8, PA9, . . . , PA12, . . . , PA15, the value of the sampling data SPD2 may be "0", . . . , "0", "1", "1", . . . , "1", . . . , "1". For the period of PA8, the value of the sampling data SPD2 may be transitioned to "1" from "0". The system on chip 300 may determine the final value of the code OP12 to be the value ("0") of the code OP12 for the period of PA8 in which the value of the sampling data SPD2 is transitioned to "1" from "0".

The system on chip 300 may provide the code OP12 for controlling the buffer 410a to the memory device 200, and may determine the final value of the code OP12 based on the sampling data SPD2 confirmed with the read DQ output from the memory device 200. Hence, the system on chip 300 may train the internal data clock signals IWCK90 and IWCK180 so that the phase difference between the internal data clock signal IWCK90 and the internal data clock signal IWCK180 may be accurately 90 degrees.

Referring to FIG. 11, the system on chip 300 may provide the write DQ marked as DQ based on the test pattern "00000001" obtained by changing the seventh bit of the test pattern of "00000011" to "0" from "1". The write DQ marked as DQ may be transitioned to the logic "1" from the logic "0" at the time that corresponds to the eighth bit of the test pattern of "00000001". The system on chip 300 may adjust the code OP22 for adjusting the delay of the internal data clock signal IWCK270 provided to the sampler circuit 420d for sampling the eighth bit. For the respective periods PA1, . . . , PA3, . . . , PA7, PA8, PA9, . . . , PA12, . . . , PA15, the waveform of the write DQ marked as DQ may be the fifth bit to eighth bit values of the test pattern.

The code OP22 may be provided to the buffer 410b of the clock signal control circuit 400. For the respective periods PA1, . . . , PA3, . . . , PA7, PA8, PA9, . . . , PA12, . . . , PA15, the system on chip 300 may adjust the code OP22. For the respective periods PA1, . . . , PA3, . . . , PA7, PA8, PA9, . . . , PA12, . . . , PA15, the clock signal control circuit 400 may adjust the delay of the data clock signal WCK270 with the steps −7, . . . , −5, . . . , −1, 0, +1, . . . , +4, . . . , +7 according to the code OP22, and may output the same as the internal data clock signal IWCK270. The sampler circuit 420d may output the sampling data SPD3 according to the delay-adjusted internal data clock signal IWCK270. For the respective periods PA1, . . . , PA3, . . . , PA7, PA8, PA9, . . . , PA12, . . . , PA15, the sampler circuit 420d may sample the write DQ marked as DQ that corresponds to the eighth bit value of the test pattern at the rising edge of the internal data clock signal IWCK270.

For the period of PA1, when the code OP22 is provided to have the value of the step −7, the write DQ marked as DQ at the rising edge of the internal data clock signal IWCK270 is the logic "0" so the value of the sampling data SPD3 sampled by the sampler circuit 420d may be "0". In a like way, for the respective periods PA3, . . . , PA7, PA8, PA9, . . . , PA12, . . . , PA15, the value of the sampling data SPD3 may be "0", . . . , "0", "1", "1", . . . , "1", . . . , "1". For the period of PA8, the value of the sampling data SPD3 may be transitioned to "1" from "0". The system on chip 300 may determine the final value of the code OP22 to be the value ("0") of the code OP22 for the period of PA8 when the value of the sampling data SPD3 is transitioned to "1" from "0".

The system on chip 300 may provide the code OP22 for controlling the buffer 410b to the memory device 200, and may determine the final value of the code OP22 based on the sampling data SPD3 confirmed with the read DQ output from the memory device 200. Hence, the system on chip 300 may train the internal data clock signals IWCK180 and IWCK270 so that the phase difference between the internal data clock signal IWCK180 and the internal data clock signal IWCK270 may be accurately 90 degrees.

FIGS. 9 to 11 show that the codes OP21, OP12, and OP22 sequentially increase from the step −7 to the step +7, but the method for the system on chip 300 to adjust the codes OP21, OP12, and OP22 is not limited thereto.

Figure 12:
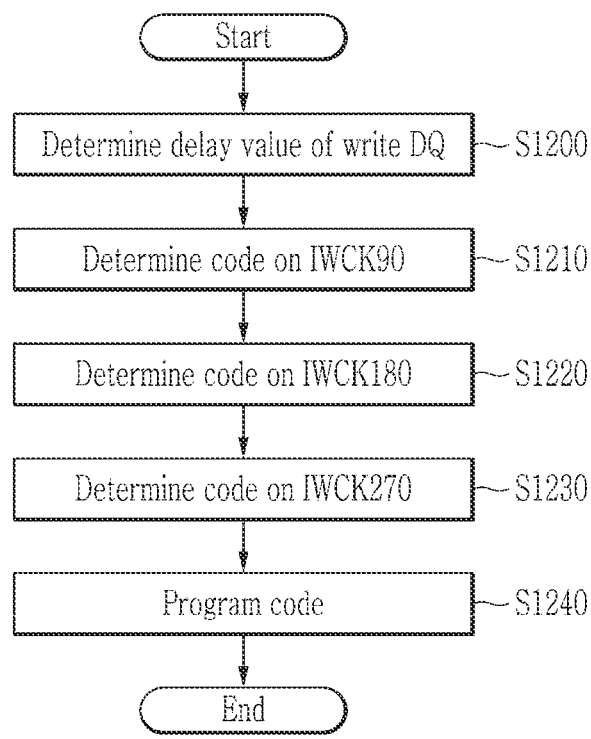
FIG. 12 shows a flowchart of a clock training method according to some example embodiments of the present disclosure.

FIG. 12 shows a flowchart of a clock training method according to some example embodiments.

Referring to FIG. 12, the system on chip 300 may determine the final value of the delay value of the write DQ (S1200). The system on chip 300 may delay the write DQ with the final value of the delay value of the write DQ and may output a result.

The system on chip 300 may determine the code OP21 for adjusting the delay of the internal data clock signal IWCK90 (S1210). The system on chip 300 may determine the code OP21 for adjusting the delay of the internal data clock signal IWCK90 of the memory device 200 based on the read DQ output from the memory device 200.

The system on chip 300 may determine the code OP12 for adjusting the delay of the internal data clock signal IWCK180 (S1220). The system on chip 300 may determine the code OP12 for adjusting the delay of the internal data clock signal IWCK180 of the memory device 200 based on the read DQ output from the memory device 200.

The system on chip 300 may determine the code OP22 for adjusting the delay of the internal data clock signal IWCK270 (S1230). The system on chip 300 may determine the code OP22 for adjusting the delay of the internal data clock signal IWCK270 of the memory device 200 based on the read DQ output from the memory device 200.

In some embodiments, order of the stages S1210, S1220, and S1230 is not limited.

The system on chip 300 may issue the MRW command to program the codes OP21, OP12, and OP22 to the mode register 222 of the memory device 200 (S1240). The memory device 200 may adjust the delays of the internal data clock signals IWCK90, IWCK180, IWCK270 by using the codes OP21, OP12, and OP22 stored in the mode register 222.

Hence, the system on chip 300 may perform the training of the data clock signal WCK of the memory device 200 in the write operation.

The respective stages of FIG. 12 will now be described in detail with reference to FIGS. 13 and 14.

Figure 13:
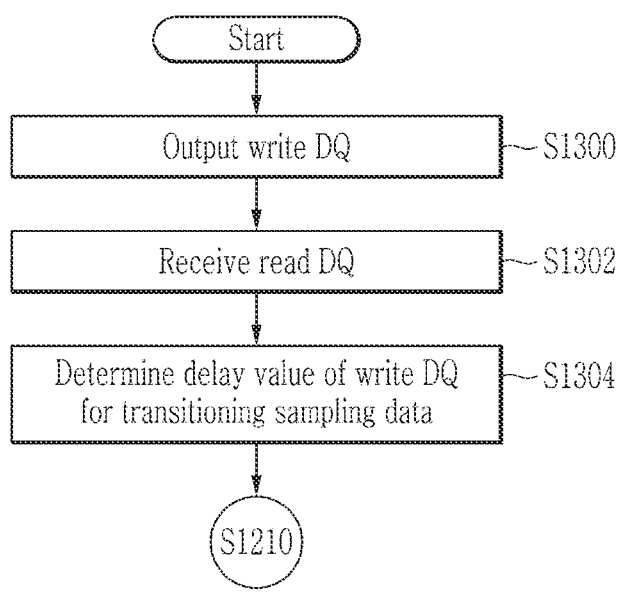
FIGS. 13 and 14 show flowcharts of some stages of a clock training method according to some example embodiments of the present disclosure.
Figure 14:
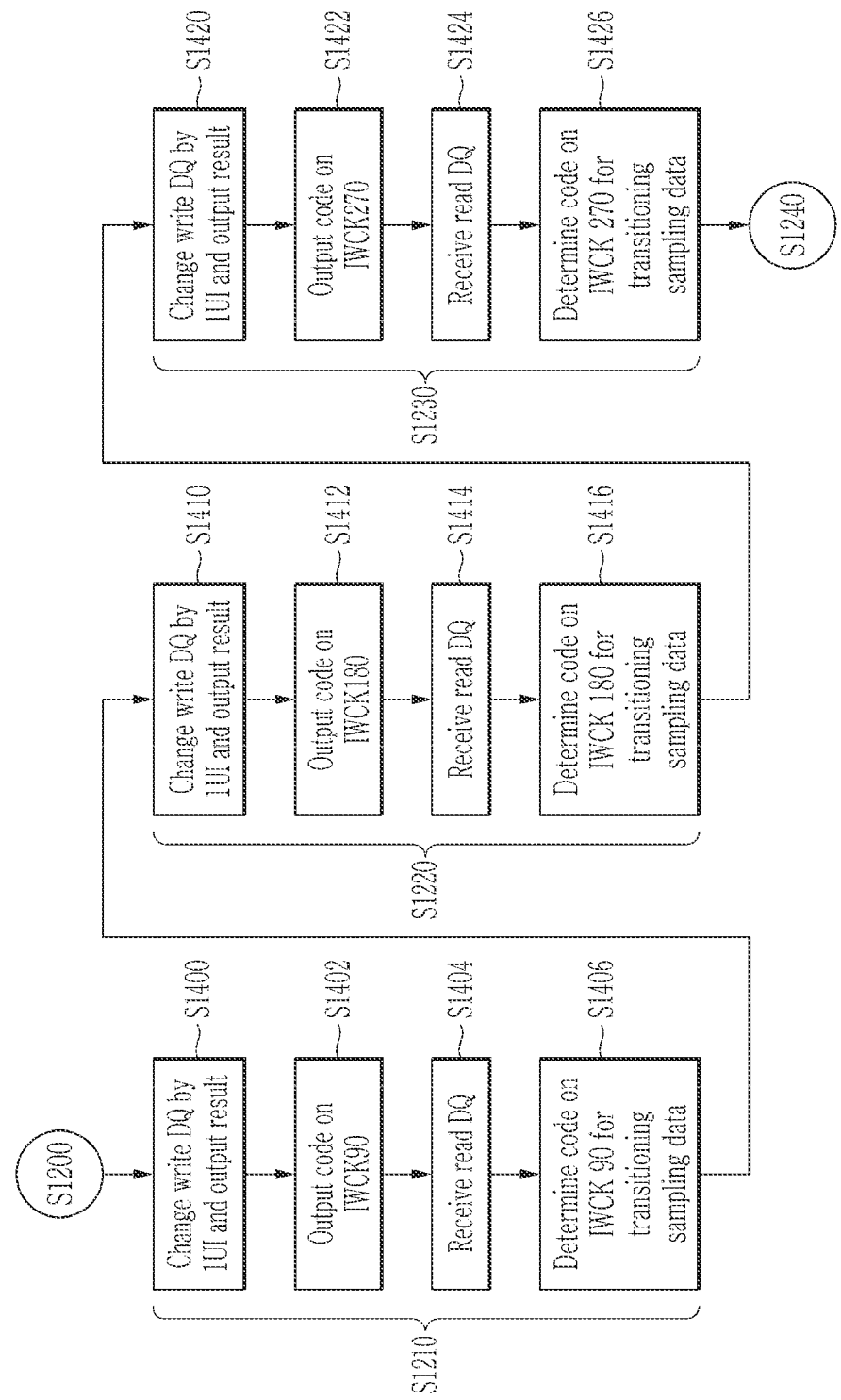

FIGS. 13 and 14 show flowcharts of some stages of a clock training method according to some example embodiments.

Referring to FIG. 13, the system on chip 300 may output a plurality of data clock signals WCK0, WCK180, WCK90, and WCK270 to the memory device 200, and may output the write DQ sampled by the memory device 200 according to the internal data clock signals IWCK0, IWCK90, IWCK180, and IWCK270 generated based on a plurality of data clock signals WCK0, WCK180, WCK90, and WCK270 (S1300). The system on chip 300 may serialize the test pattern and may output a result as the write DQ (e.g., may output a result as a data signal). The test pattern may have the data arranged so that the write DQ may be transitioned corresponding to the rising edge of one of the internal data clock signals IWCK0, IWCK90, IWCK180, and IWCK270. The system on chip 300 may delay the write DQ for respective groups of a plurality of step units by changing the delay value of the write DQ. In this instance, the system on chip 300 may set the codes OP11, OP12, OP21, and OP22 as default values and may provide them.

The system on chip 300 may receive the read DQ (e.g., an output signal) from the memory device 200 (S1302).

The system on chip 300 may determine the final value of the delay value for transitioning the sampling data by using the sampling data sampled by one of the internal data clock signals IWCK0, IWCK90, IWCK180, and IWCK270 from the read DQ (S1304). The system on chip 300 may determine the final value of the delay value of the write DQ so that the write DQ may be arranged with one of the internal data clock signals IWCK0, IWCK90, IWCK180, and IWCK270. The system on chip 300 may determine the final value of the delay value of the write DQ so that the rising edge of one of the internal data clock signals IWCK0, IWCK90, IWCK180, and IWCK270 and the transition timing of the write DQ may be arranged.

Referring to FIG. 14, the stages S1210, S1220, and S1230 of FIG. 12 are described. The system on chip 300 may output the write DQ so that the timing when the write DQ is transitioned may be changed by one unit interval (UI) (S1400). The system on chip 300 may change the timing when the write DQ is transitioned by one UI by changing the test pattern by one bit.

The system on chip 300 may output the code OP21 or OP22 for adjusting the delay of the internal data clock signal IWCK90 or IWCK270 that has the 90 degrees of the phase difference from the internal data clock signal IWCK0 arranged with the write DQ to the memory device 200 (S1402). The system on chip 300 may increase/reduce the value of the code OP21 or OP22 and may provide a result. In this instance, the system on chip 300 may set the codes OP11, OP12, OP22 or OP11, OP12, and OP21 as default values and may provide them. When the timing when the write DQ is transitioned is advanced by one UI at the stage of S1400, the delay of the internal data clock signal IWCK270 with the −90 degrees of the phase difference may be adjusted, and when the timing when the write DQ is transitioned is delayed by one UI, the delay of the internal data clock signal IWCK270 with the +90 degrees of the phase difference may be adjusted. The system on chip 300 will be described hereinafter to delay the timing when the write DQ is transitioned by one UI.

The system on chip 300 may receive the read DQ from the memory device 200 (S1404).

The system on chip 300 may determine the value of the code OP21 for indicating the delay for the sampling data to be transitioned to be the final value of the code OP21 by using the sampling data sampled by the internal data clock signal IWCK90 in the read DQ (S1406).

When the final value of the code OP21 for delaying the internal data clock signal IWCK90 is determined, the system on chip 300 may output the write DQ so that the timing when the write DQ is transitioned is changed by one UI (S1410).

The system on chip 300 may output the code OP12 for adjusting the delay of the internal data clock signal IWCK180 with the 90 degrees of the phase difference from the internal data clock signal IWCK90 arranged with the write DQ to the memory device 200 (S1412). The system on chip 300 may increase/reduce the value of the code OP12 and may provide a result. In this instance, the system on chip 300 may provide the code OP21 with the value determined at the stage of S1406, may set the codes OP11 and OP22 as default values, and may provide the same.

The system on chip 300 may receive the read DQ from the memory device 200 (S1414).

The system on chip 300 may determine the value of the code OP12 for indicating the delay by which the sampling data are transitioned to be the final value of the code OP12 by using the sampling data sampled by the internal data clock signal IWCK180 in the read DQ (S1416).

When the final value of the code OP12 for delaying the internal data clock signal IWCK180 is determined, the system on chip 300 may output the write DQ so that the timing when the write DQ is transitioned is changed by one UI (S1420).

The system on chip 300 may output the code OP22 for adjusting the delay of the internal data clock signal IWCK270 with the 90 degrees of the phase difference from the internal data clock signal IWCK180 arranged with the write DQ to the memory device 200 (S1422). The system on chip 300 may increase/reduce the value of the code OP22 and may provide a result. In this instance, the system on chip 300 may provide the codes OP21 and OP12 with the values determined at the stages of S1406 and S1416, may set the code OP11 as a default value, and may provide the same.

The system on chip 300 may receive the read DQ from the memory device 200 (S1424).

The system on chip 300 may determine the value of the code OP22 for indicating the delay for the sampling data to be transitioned to be the final value of the code OP22 by using the sampling data sampled by the internal data clock signal IWCK270 in the read DQ (S1426).

In the above, the system on chip 300 may arrange the write DQ transitioned once with one internal data clock signal, may change the transition timing of the write DQ by each one UI, and may adjust the delay of the internal data clock signal in addition to the internal data clock signal arranged with the write DQ. Therefore, as the internal data clock signal may be trained to be arranged with the sampling timing of the write DQ, the signal may be sampled at the more accurate timing during the actual write operation.

Figure 15:
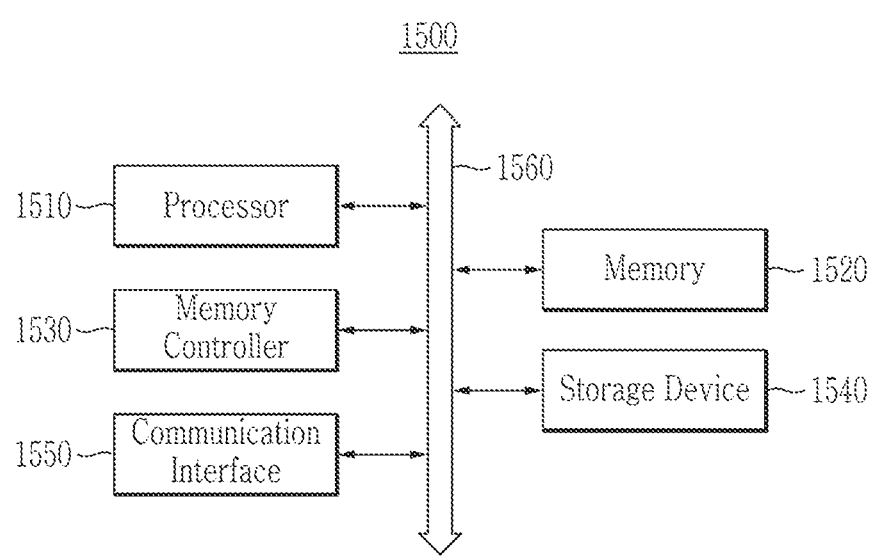
FIG. 15 shows a block diagram of a computer system according to some example embodiments of the present disclosure.

FIG. 15 shows a block diagram of a computer system according to some example embodiments.

Referring to FIG. 15, the computing system 1500 may include a processor 1510, a memory 1520, a memory controller 1530, a storage device 1540, a communication interface 1550, and a bus 1560. The computing system 1500 may further include other general-purpose constituent elements.

The processor 1510 may control general operations of respective elements of the computing system 1500. The processor 1510 may be realized with at least one of various processing units including a central processing unit (CPU), an application processor (AP), and a graphics processing unit (GPU).

The memory 1520 may store various types of data and commands. The memory 1520 may be realized with the memory device described with reference to FIGS. 1 to 14. The memory controller 1530 may control transmission of data or commands to/from the memory 1520.

The processor 1510 and the memory controller 1530 may be realized with the system on chip described with reference to FIGS. 1 to 14. In some embodiments, the memory controller 1530 may be provided to an internal element of the processor 1510. In some embodiments, the memory controller 1530 may be provided to a chip in addition to the processor 1510.

The memory controller 1530 may output the write DQ to the memory 1520 based on the test pattern with the data arranged so that the write DQ may be changed once. The memory controller 1530 may adjust the delay value of the write DQ so that one of the internal data clock signals IWCK0, IWCK90, IWCK180, and IWCK270 and the write DQ may be arranged. The memory controller 1530 may, when the write DQ and one internal data clock signal (e.g., IWCK0) are arranged, change the test pattern by one bit and may output the write DQ to the memory 1520. The memory controller 1530 may output the code for adjusting the delay of the internal data clock signal IWCK0 from among the remaining internal data clock signals and the internal data clock signal IWCK90 with the phase difference (e.g., 90 degrees) that corresponds to one UI of the write DQ to the memory 1520, and may determine the final value of the code for adjusting the delay of the internal data clock signal IWCK90 by using the value of the sampling data in the read DQ transmitted from the memory 1520. In a like way, in the case of the other internal data clock signals IWCK180 and IWCK270, the memory controller 1530 may determine the final value of the code for adjusting the respective delays of the internal data clock signals IWCK180 and IWCK270.

The memory controller 1530 may provide the final value of the codes to the memory 1520.

The storage device 1540 may non-temporarily store programs and data. In some embodiments, the storage device 1540 may be realized with a non-volatile memory. The communication interface 1550 may support a wired/wireless network communication of the computing system 1500. Further, the communication interface 1550 may support various other communication methods in addition to the network communication. The bus 1560 may provide a communication function among the constituent elements of the computing system 1500. The bus 1560 may include at least one type of bus according to communication protocols among the constituent elements.

In some embodiments, the respective constituent elements or combination of two or more of the constituent elements described with reference to FIGS. 1 to 15 may be realized with a digital circuit, a programmable or non-programmable logic device or array, and an application specific integrated circuit (ASIC).

While this disclosure has been described in connection with what is presently considered to be practical embodiments, it is to be understood that the invention is not limited to the disclosed embodiments, but, on the contrary, is intended to cover various modifications and equivalent arrangements included within the scope of the appended claims.

What is claimed is:

1. A semiconductor device comprising:
    a data clock signal generator circuit configured to output a plurality of data clock signals that have different phases and that are used to generate a plurality of internal data clock signals of a memory device;
    a data transmitter configured to generate a data signal based on a test pattern transitioned once, delay the data signal once transitioned according to a delay value, and output the data signal to the memory device;
    a data receiver configured to receive an output signal from the memory device that includes first sampling data, the first sampling data being obtained by sampling the data signal based on a first internal data clock signal from the plurality of internal data clock signals; and
    a training circuit configured to change the delay value and determine a final value of the delay value based on the first sampling data.

2. The semiconductor device of claim 1, wherein
    the training circuit is configured to determine the final value of the delay value based on a sampling delay value of the first sampling data, and
    wherein the sampling delay value corresponds to when a bit value of the first sampling data is transitioned.

3. The semiconductor device of claim 1, wherein
    the training circuit is configured to determine the final value of the delay value based on an intermediate value of sampling delay values of the first sampling data,
    wherein the intermediate value is between a first sampling delay value and a second sampling delay value of the sampling delay values,
    wherein the first sampling delay value corresponds to when a first bit value of the first sampling data is transitioned, and the second sampling delay value corresponds to when a second bit value of the first sampling data is transitioned, and
    wherein the first and second bit values are both transitioned from a same one of 1 to 0 or 0 to 1.

4. The semiconductor device of claim 1, wherein
    the training circuit is configured to change a bit value of the test pattern, after determining the final value of the delay value, such that a timing when the data signal is transitioned is changed,
    wherein the data receiver is configured to receive an output signal from the memory device that includes second sampling data, the second sampling data being obtained by sampling the data signal that has the timing changed based on a second internal data clock signal from the plurality of internal data clock signals, and
    wherein the training circuit is configured to adjust a code that is used to generate the second internal data clock signal of the memory device, and is configured to determine a final value of the code based on the second sampling data.

5. The semiconductor device of claim 4, wherein
    the training circuit is configured to determine the final value of the code based on a sampling value of the code obtained from the second sampling data, and
    wherein the sampling value of the code corresponds to when a bit value of the second sampling data is transitioned.

6. The semiconductor device of claim 4, wherein
    the training circuit is configured to change the timing when the data signal is transitioned by one unit interval (UI) by changing one bit value of the test pattern.

7. The semiconductor device of claim 4, wherein
    the code is used to adjust a delay of a data clock signal from the plurality of data clock signals and to generate the second internal data clock signal, and
    wherein the second internal data clock signal has a delay that is based on the code.

8. The semiconductor device of claim 4, wherein
    the first internal data clock signal and the second internal data clock signal have a phase difference of 90 degrees.

9. A method for operating a semiconductor device, comprising:
    outputting a plurality of data clock signals having different phases and used in generating a plurality of internal data clock signals of a memory device;
    generating a data signal based on a test pattern transitioned once, delaying the data signal once transitioned according to a delay value, and outputting the data signal to the memory device;
    receiving an output signal from the memory device including first sampling data, the first sampling data being obtained by sampling the data signal based on a first internal data clock signal from the plurality of internal data clock signals; and
    determining a final value of the delay value based on the first sampling data.

10. The method of claim 9, wherein
    the determining of the final value of the delay value comprises determining a sampling delay value of the first sampling data, and
    wherein the sampling delay value corresponds to when a bit value of the first sampling data is transitioned.

11. The method of claim 9, wherein
    the determining of the final value of the delay value comprises determining an intermediate value of sampling delay values of the first sampling data,
    wherein the intermediate value is between a first sampling delay value and a second sampling delay value of the sampling delay values,
    wherein the first sampling delay value corresponds to when a first bit value of the first sampling data is transitioned, and the second sampling delay value corresponds to when a second bit value of the first sampling data is transitioned, and wherein the first and second bit values are both transitioned from a same one of 1 to 0 or 0 to 1.

12. The method of claim 9, further comprising:

changing a bit value of the test pattern, after determining the final value of the delay value, to change a timing when the data signal is transitioned;

receiving an output signal including second sampling data from the memory device, the second sampling data being obtained by sampling the data signal that has the timing change based on a second internal data clock signal from the plurality of internal data clock signals;

adjusting a code for generating the second internal data clock signal of the memory device; and determining a final value of the code based on the second sampling data.

13. The method of claim 12, wherein the determining of the final value of the code comprises determining a sampling value of the code obtained from the second sampling data, and wherein the sampling value of the code corresponds to when a bit value of the second sampling data is transitioned.

14. The method of claim 12, wherein the changing of the bit value of the test pattern comprises changing the timing when the data signal is transitioned by one unit interval (UI).

15. The method of claim 12, wherein the code is used to adjust a delay of a data clock signal from the plurality of data clock signals and to generate the second internal data clock signal, and wherein the second internal data clock signal has a delay that is based on the code.

16. A computing system comprising:

a memory device comprising:

a clock signal control circuit configured to receive and buffer a plurality of data clock signals with different phases and generate a plurality of internal data clock signals; and a plurality of sampler circuits configured to sample a data signal based on the plurality of internal data clock signals and output a plurality of sampling data; and a system on chip configured to serialize a test pattern to generate the data signal, delay the data signal according to a delay value, output the data signal to the memory device, determine a final value of the delay value based on a value of first sampling data from the plurality of sampling data, delay the data signal according to the final value of the delay value, and output the data signal that is delayed according to the final value of the delay value, wherein the first sampling data is obtained by sampling the data signal based on a first internal data clock signal from the plurality of internal data clock signals, and wherein the first internal data clock signal is synchronized with a timing when the data signal is transitioned.

17. The computing system of claim 16, wherein the clock signal control circuit is configured to generate a second internal data clock signal from the plurality of internal data clock signals by adjusting a phase of a data clock signal from the plurality of data clock signals according to a code, wherein the system on chip is configured to change one bit value of the test pattern to arrange a timing when the data signal is transitioned to correspond to an edge of the second internal data clock signal, adjust a value of the code, determine a final value of the code based on second sampling data, and store the final value of the code in the memory device, and wherein the second sampling data is obtained by sampling the data signal based on the second internal data clock signal.

18. The computing system of claim 17, wherein the clock signal control circuit comprises a buffer configured to generate the second internal data clock signal, and configured to adjust a delay of the data clock signal according to the code.

19. The computing system of claim 17, wherein the first internal data clock signal and the second internal data clock signal have a phase difference of 90 degrees.

20. The computing system of claim 17, wherein the system on chip is configured to determine the final value of the code based on a sampling value of the code obtained from the second sampling data, and wherein the sampling value of the code corresponds to when a bit value of the second sampling data is transitioned.

* * * * *